(12) United States Patent
Nguyen et al.

(10) Patent No.: US 12,106,516 B2
(45) Date of Patent: Oct. 1, 2024

(54) POSE ESTIMATION REFINEMENT FOR AERIAL REFUELING

(71) Applicant: The Boeing Company, Chicago, IL (US)

(72) Inventors: Leon Nhat Nguyen, Santa Ana, CA (US); Haden Harrison Smith, Topanga, CA (US); Fan Hin Hung, Los Angeles, CA (US); Deepak Khosla, Camarillo, CA (US); Taraneh Sadjadpour, San Jose, CA (US)

(73) Assignee: The Boeing Company, Chicago, IL (US)

( * ) Notice: Subject to any disclaimer, the term of this patent is extended or adjusted under 35 U.S.C. 154(b) by 320 days.

(21) Appl. No.: 17/569,440

(22) Filed: Jan. 5, 2022

(65) Prior Publication Data

US 2023/0215041 A1 Jul. 6, 2023

(51) Int. Cl.
*G06K 9/00* (2022.01)
*B64D 39/00* (2006.01)
(Continued)

(52) U.S. Cl.
CPC ................ *G06T 7/75* (2017.01); *B64D 39/00* (2013.01); *G05D 1/104* (2013.01); *G06T 19/006* (2013.01)

(58) Field of Classification Search
CPC .......... G06T 7/75; G06T 19/006; G06T 7/73; G06T 2207/20081; G06V 20/17;
(Continued)

(56) References Cited

U.S. PATENT DOCUMENTS 5,499,784 A 3/1996 Crabere et al.
5,904,729 A 5/1999 Ruzicka
(Continued)

FOREIGN PATENT DOCUMENTS

WO 2009152091 A2 12/2009
WO 2022014354 A1 1/2022

OTHER PUBLICATIONS

Extended European Search Report, Application No. 22213085.8, Mailed May 30, 2023.
(Continued)

*Primary Examiner* — Duy M Dang
(74) *Attorney, Agent, or Firm* — Jordan IP Law, LLC

(57) ABSTRACT

Aspects of the disclosure provide fuel receptacle position/pose estimation for aerial refueling (derived from aircraft position and pose estimation). A video frame, showing an aircraft to be refueled, is received from a single camera. An initial position/pose estimate is determined for the aircraft, which is used to generating an initial rendering of an aircraft model. The video frame and the initial rendering are used to determining refinement parameters (e.g., a translation refinement and a rotational refinement) for the initial position/pose estimate, providing a refined position/pose estimate for the aircraft. The position/pose of a fuel receptacle on the aircraft is determined, based on the refined position/pose estimate for the aircraft, and an aerial refueling boom may be controlled to engage the fuel receptacle. Examples extract features from the aircraft in the video frame and the aircraft model rendering, and use a deep learning neural network (NN) to determine the refinement parameters.

20 Claims, 15 Drawing Sheets

(51) Int. Cl.
  *G05D 1/00* (2006.01)
  *G06T 7/73* (2017.01)
  *G06T 19/00* (2011.01)

(58) Field of Classification Search
  CPC .......... B64D 39/00; B64D 39/06; G06N 3/08; G03B 15/006; G05D 1/104; G08G 5/00; G08G 5/0034; G08G 5/0091
  See application file for complete search history.

(56) References Cited

U.S. PATENT DOCUMENTS

| | | | |
|---|---|---|---|
| 9,150,310 | B1 | 10/2015 | Bray et al. |
| 9,437,113 | B2* | 9/2016 | Bush ............... G08G 5/0034 |
| 9,840,336 | B2* | 12/2017 | Barsheshet ............ B64D 39/04 |
| 11,074,717 | B2 | 7/2021 | Tremblay et al. |
| 2003/0026505 | A1 | 2/2003 | Florent et al. |
| 2003/0209633 | A1 | 11/2003 | Thal et al. |
| 2010/0274444 | A1* | 10/2010 | Williamson ............ B64D 39/00 701/29.8 |
| 2010/0321011 | A1 | 12/2010 | Small et al. |
| 2014/0216088 | A1 | 8/2014 | Weber |
| 2017/0301109 | A1 | 10/2017 | Chan et al. |
| 2018/0210466 | A1 | 7/2018 | Weaver et al. |
| 2019/0122073 | A1 | 4/2019 | Ozdemir et al. |
| 2019/0382126 | A1 | 12/2019 | Rix et al. |
| 2020/0379486 | A1 | 12/2020 | Khosla et al. |
| 2021/0039804 | A1 | 2/2021 | Ropers |
| 2021/0403175 | A1 | 12/2021 | Kyono et al. |

OTHER PUBLICATIONS

Mammarella M. et al., "Machine Vision/GPS Integration Using EKF for the UAV Aerial Refueling Problem," IEEE Transactions on Systems, Man, And Cybernetics: Part C: Applications and Reviews, IEEE Service Center, Piscataway, NJ, US, vol. 38, No. 6, Nov. 30, 2008.

Sun Siyang et al., "Robust Visual Detection and Tracking Strategies for Autonomous Aerial Refueling of UAVs," IEEE Transactions on Instrumentation and Measurement, USA, vol. 68, No. 12, Dec. 31, 2019.

Sharma Sumant et al., "Neural Network-Based Pose Estimation for Noncooperative Spacecraft Rendezvous," IEEE Transactions on Aerospace and Electronic Systems, IEEE Service Center, Piscataway, NJ, US, vol. 5, No. 6, Jun. 2, 2020.

Zhang et al., "Binocular Pose Estimation for UAV Autonomous Aerial Refueling via Brain Storm Optimization," Conference: 2019 IEEE Congress on Evolutionary Computation (CEC), 8 pages. DOI:10.1109/CEC.2019.8789952.

Duan et al., "A binocular vision-based UAVs autonomous aerial refueling platform," Science China, Information Sciences, 2016, vol. 59, 7 pages. DOI:10.1007/s11432-016-5553-5.

Doebbler, et al., "Boom and Receptacle Autonomous Air Refueling Using Visual Snake Optical Sensor," Journal of Guidance and Control and Dynamics, vol. 30, No. 6, Nov. 1, 2007, 24 pages.

Anderson, et al., "Augmenting Flight Imagery from Aerial Refueling," In Proceedings of ISVC 2019, LNCS 11845, pp. 154-165, 2019.

Vendra, et al., "Addressing corner detection issues for machine vision based UAV aerial refueling," Machine Vision and Applications, Springer, Berlin, DE, vol. 18, No. 5, Jan. 10, 2007, pp. 261-273.

Duan, et al., "Visual Measurement in Simulation Environment for Vision-Based UAV Autonomous Aerial Refueling," IEEE Transactions on Instrumentation and Measurement, IEEE, USA, vol. 64, No. 9, Sep. 1, 2015, pp. 2468-2480.

Cui, et al., "Visual Servoing of a Flexible Aerial Refueling Boom With an Eye-in-Hand Camera," IEEE Transactions on Systems, Man, and Cybernetics: Systems, IEEE, Piscataway, NJ, USA, vol. 51, No. 10, Jan. 8, 2020, pp. 6282-6292.

Mai, W. et al., "Feature-aided Bundle Adjustment Learning Framework for Self-supervised Monocular Visual Odometry," IEEE/RSJ International Conference on Intelligent Robots and Systems (IROS), Sep. 27-Oct. 1, 2021, pp. 9160-9167.

Mildenhall, B. et al., "NeRF: Representing Scenes as Neural Radiance Fields for View Synthesis," Communications of the ACM, Dec. 17, 2021, 65(1); pp. 99-106. https://doi.org/10.1145/3503250.

Lynch, J. C., "Monocular Pose Estimation for Automated Aerial Refueling via Perspective-n-Point," Air Force Institute of Technology, Theses and Dissertations, 2022, pp. 1-76. https://scholar.afit.edu/etd/6910.

Extended European Search Report, Application No. 24165111.6, dated Jul. 10, 2024. 8 pages.

* cited by examiner

POSE ESTIMATION REFINEMENT FOR AERIAL REFUELING

BACKGROUND

Aerial refueling (air-to-air refueling) is typically performed manually, by a highly-skilled human refueling boom operator. Some arrangements place the human operator behind a window, with a view of the refueling boom and the aircraft to be refueled. This type of arrangement requires the added significant expense of providing accommodation for the human operator in the rear of the refueling platform.

Some arrangements use stereoscopic vision with dual cameras, in which the human operator wears goggles that provide a three-dimensional (3D) view based on the views from the dual cameras. Some other arrangements use light detection and ranging (LIDAR) or radar to provide supplemental range measurements for the human operator. These latter types of arrangements require additional expensive components.

SUMMARY

The disclosed examples are described in detail below with reference to the accompanying drawing figures listed below. The following summary is provided to illustrate examples or implementations disclosed herein. It is not meant, however, to limit all examples to any particular configuration or sequence of operations.

Examples provided herein include solutions for aerial refueling that include: receiving a video frame showing an aircraft to be refueled; receiving an initial position estimate and an initial pose estimate for the aircraft; based on at least the initial position estimate and the initial pose estimate, generating an initial rendering of an aircraft model of the aircraft; based on at least the video frame and the initial rendering of the aircraft model, determining refinement parameters for the initial position estimate and the initial pose estimate; based on at least the initial position estimate, the initial pose estimate, and the refinement parameters, determining a refined position estimate and a refined pose estimate for the aircraft; based on at least the refined position estimate and the refined pose estimate for the aircraft, determining a position and pose of a fuel receptacle on the aircraft; and based on at least the position and pose of the fuel receptacle, controlling an aerial refueling boom to engage the fuel receptacle.

BRIEF DESCRIPTION OF THE DRAWINGS

The disclosed examples are described in detail below with reference to the accompanying drawing figures listed below.

Corresponding reference characters indicate corresponding parts throughout the drawings in accordance with an example.

DETAILED DESCRIPTION

Figure 1:
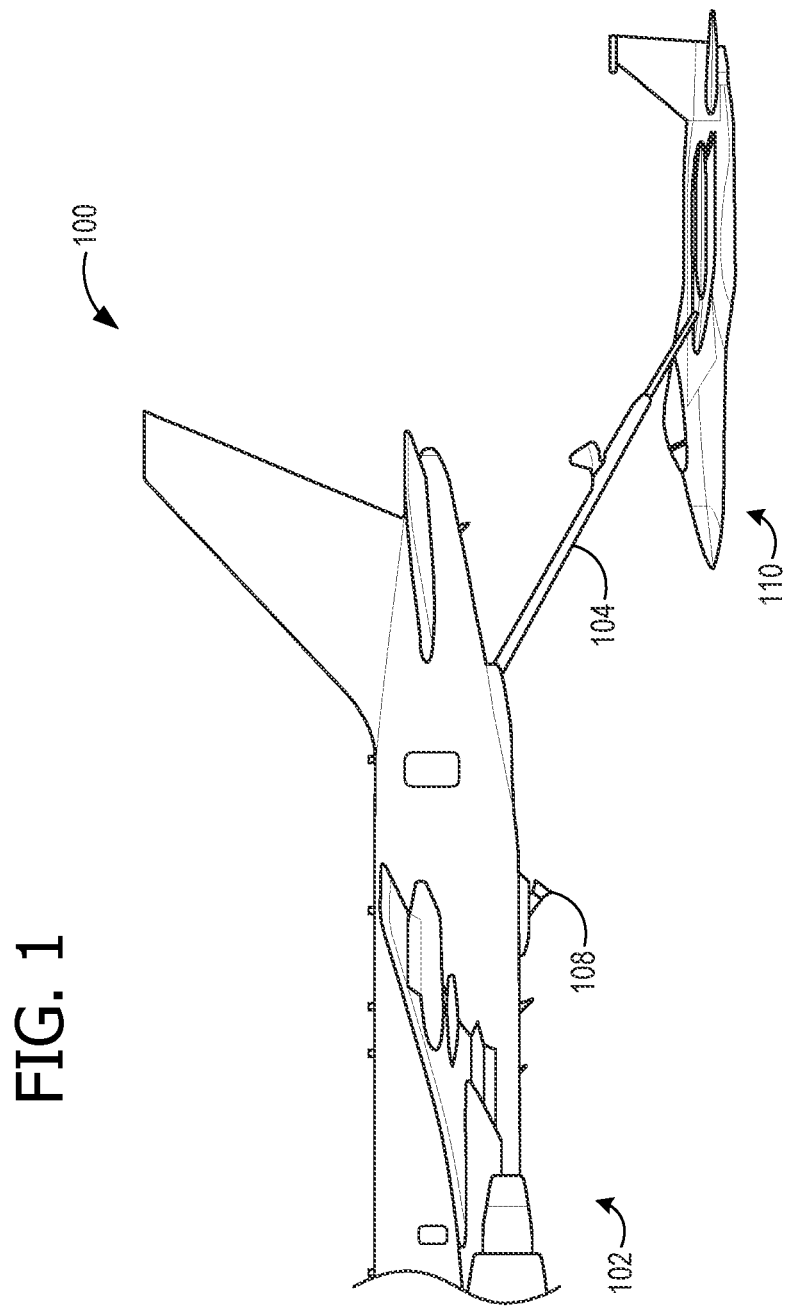
FIG. 1 illustrates an arrangement 100 that employs aircraft position and pose estimation for aerial refueling, in accordance with an example.

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all implementations.

The foregoing summary, as well as the following detailed description of certain implementations will be better understood when read in conjunction with the appended drawings. As used herein, an element or step recited in the singular and preceded by the word "a" or "an" should be understood as not necessarily excluding the plural of the elements or steps. Further, references to an implementation or an example are not intended to be interpreted as excluding the existence of additional examples that also incorporate the recited features. Moreover, unless explicitly stated to the contrary, examples "comprising" or "having" an element or a plurality of elements having a particular property could include additional elements not having that property.

Aspects and implementations disclosed herein are directed to aircraft position and pose estimation for aerial refueling that include: receiving a video frame showing an aircraft to be refueled; receiving an initial position estimate and an initial pose estimate for the aircraft; based on at least the initial position estimate and the initial pose estimate, generating an initial rendering of an aircraft model of the aircraft; based on at least the video frame and the initial rendering of the aircraft model, determining refinement parameters for the initial position estimate and the initial pose estimate; based on at least the initial position estimate, the initial pose estimate, and the refinement parameters, determining a refined position estimate and a refined pose estimate for the aircraft; based on at least the refined position estimate and the refined pose estimate for the aircraft, determining a position and pose of a fuel receptacle on the aircraft; and based on at least the position and pose of the fuel receptacle, controlling an aerial refueling boom to engage the fuel receptacle. Some examples use only a single camera (monocular vision) for video input. Some examples overlay projections of an aircraft model on displayed video for a human operator or observer. Some examples enable automated aerial refueling, such as aerial refueling without requiring a highly-skilled human refueling boom operator.

Aspects of the disclosure have a technical effect of improved operation of a computer, for example by improving the efficiency of computational hardware, and improved allocation of resources, as compared with traditional systems that rely on, for example, processing multiple different measurement inputs. Aspects of the disclosure are able to estimate the position and orientation of a three-dimensional (3D) object (e.g., an aircraft fuel receptacle) in a video stream collected by a single camera, such as in support of autonomous aerial refueling operations and/or human-assisted aerial refueling operations. For example, aspects of the disclosure locate the relative positions and orientations (poses) of an aircraft fuel receptacle and a refueling platform's refueling boom in order to automate control of the refueling boom during refueling. In some examples, position and pose information is represented as six degrees-of-freedom (6DoF) including the three-dimensional (3D) position (x, y, and z coordinates) and orientation (roll, pitch, and yaw). As used herein, pose refers to orientation (e.g., roll, pitch, and yaw), whereas position may refer to 3D position (e.g., x, y, z location) or 6DoF position (e.g., x, y, z location and roll, pitch, and yaw).

The location occurs in stages, such as determining initial 3D position and 3D pose estimates (together an initial 6DoF position estimate) for the aircraft, rendering an aircraft model in accordance with the initial 6DoF position estimate, and determining a refined 6DoF position estimate based on comparing the live video of the real-world aircraft with the rendering an aircraft model. Examples employ real-time deep learning-based solutions, for example, a neural network (NN) such as a deep convolutional neural network (CNN), which may be a residual neural network (ResNet) such as ResNet50. This provides accurate estimation refinement under adverse weather and lighting conditions which can be used for autonomous aerial (air-to-air) refueling, and/or an operator feedback loop. The use of a single camera may reduce component failures and be more easily integrated into existing systems.

Referring more particularly to the drawings, FIG. 1 illustrates an arrangement 100 that includes a refueling platform 102 and an aircraft 110 to be refueled. Each of the refueling platform 102 and the aircraft 110 may be an example of a flying apparatus 1101, described in further retail in relation to FIGS. 11 and 12. In the arrangement 100, the refueling platform 102 uses an aerial refueling boom 104 to refuel the aircraft 110. A camera 108 provides a video stream 200a (shown in FIG. 3) for use in position and pose estimation.

Figure 2A:
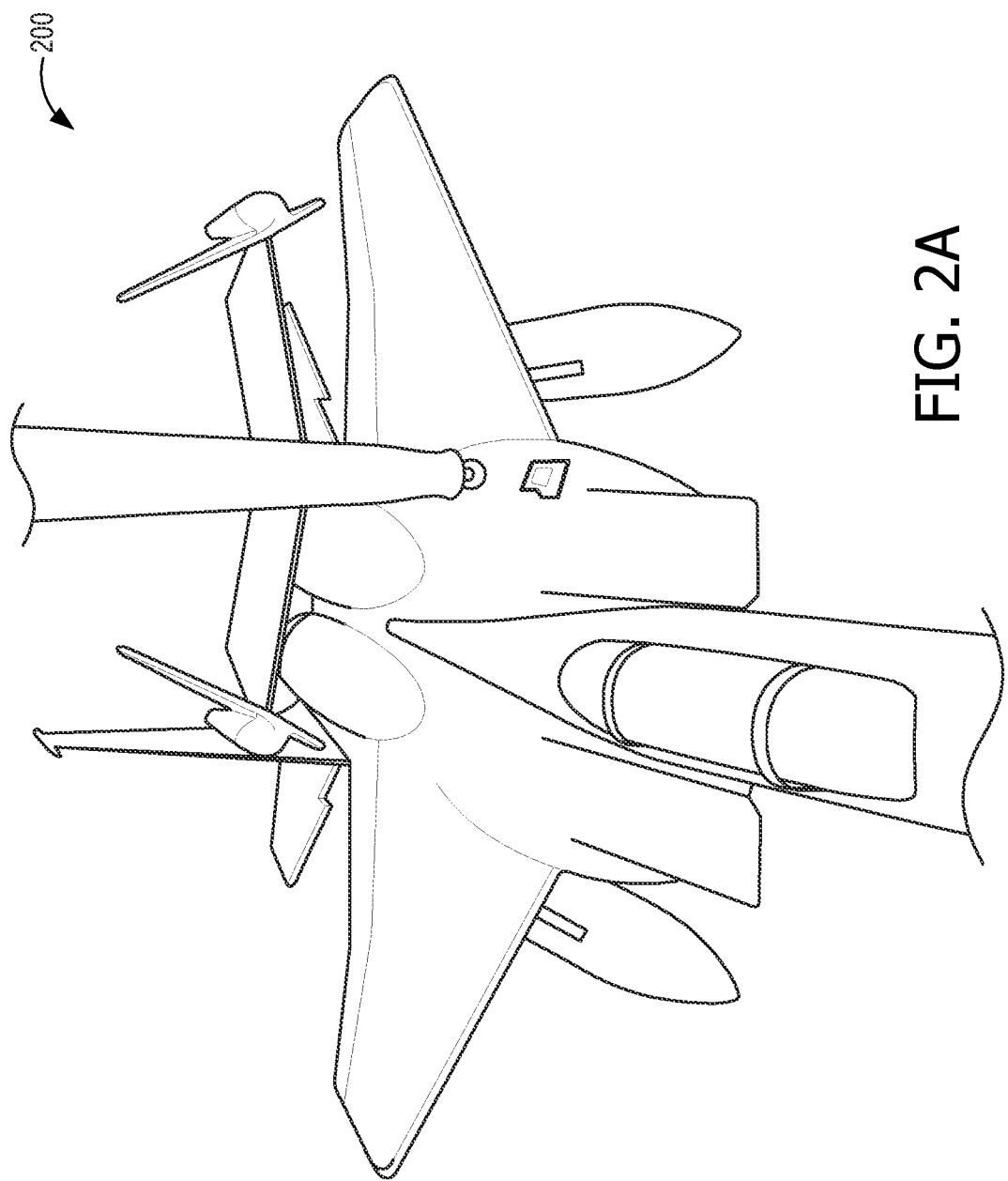
FIG. 2A shows a representative video frame 200 from an aerial refueling operation, in accordance with an example.
Figure 2B:
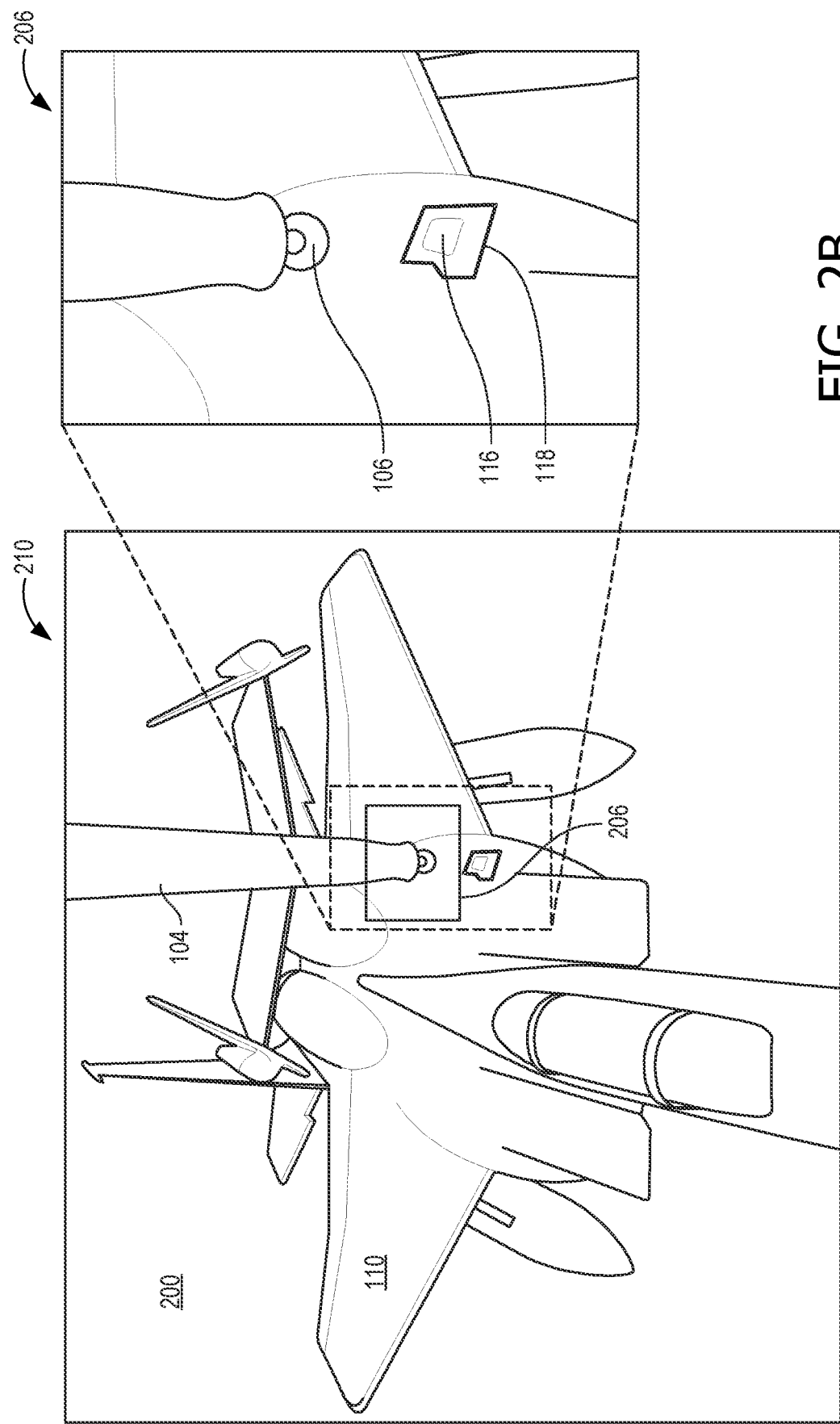
FIG. 2B shows an annotated version of the video frame 200.

FIG. 2A shows a representative video frame 200 from an aerial refueling operation. For clarity, FIG. 2A shows only a clean version of the video frame 200. FIG. 2B shows an annotated version of the video frame 200. The video frame 200 shows a cropped view of the aircraft 110 and the aerial refueling boom 104 as may be seen in within an aircraft bounding box 210. The aircraft bounding box 210 is generated by an early stage of an aircraft position and pose estimation pipeline 400, as described below for FIG. 4. The aircraft 110 has a fuel receptacle 116, which is outlined by a fiducial marker 118. The video frame 200 also shows the aerial refueling boom 104, with a boom tip 106, outlined with a boom tip bounding box 206. The boom tip bounding box 206 is generated by an early stage of a boom tip position and pose estimation pipeline 600, as described below for FIG. 6. In operation, the aerial refueling boom 104 delivers fuel to the aircraft 110 by the boom tip 106 engaging the fuel receptacle 116. The fiducial marker 118 facilitates location of the fuel receptacle 116 on the aircraft 110.

Figure 3:
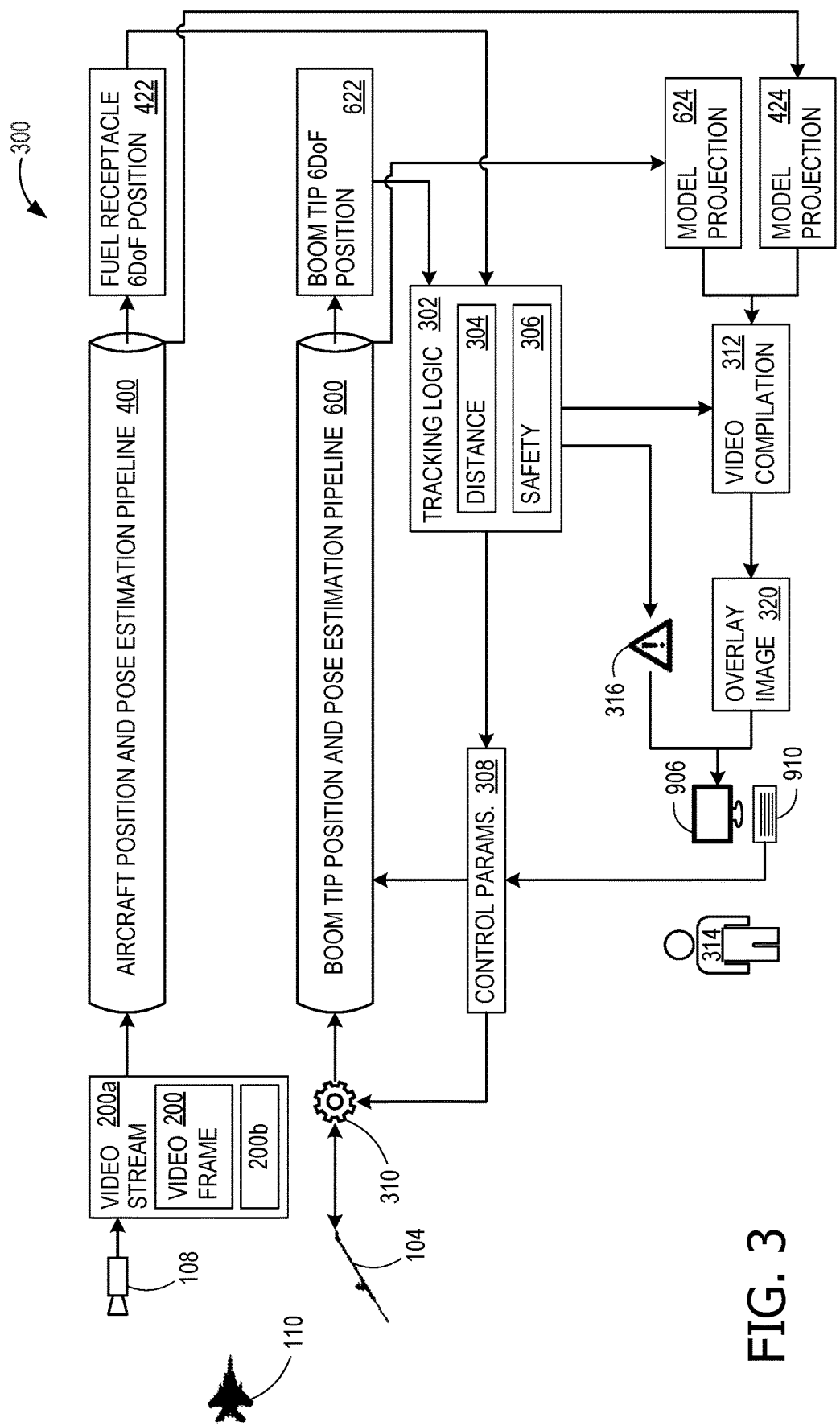
FIG. 3 illustrates a block diagram of a computer vision (CV) architecture 300 that can be used in the arrangement 100, in accordance with an example.

FIG. 3 illustrates a block diagram of a computer vision (CV) architecture 300 that performs fuel receptacle and boom tip position and pose estimation for the arrangement 100. The components of the architecture 300 are identified in FIG. 3, with further detail shown in FIGS. 4 and 6, and the operation of the architecture 300 is described in further detail in relation to FIG. 7 (showing a flowchart 700). The architecture 300 receives a video stream 200a comprising the video frame 200 and a plurality of additional video frames 200b from the camera 108. The processing of the video frame 200 will be described. Processing of each of the plurality of additional video frames 200b is similar to that for the video frame 200.

The architecture 300 includes an aircraft position and pose estimation pipeline 400 and a boom tip position and pose estimation pipeline 600. The aircraft position and pose estimation pipeline 400 is shown and described in further detail in relation to FIG. 3. The boom tip position and pose estimation pipeline 600 is shown and described in further detail in relation to FIG. 6.

The aircraft position and pose estimation pipeline 400 outputs a fuel receptacle position 422 (a position and pose of a fuel receptacle on the aircraft 110), for example, in 6DoF. In some examples, the aircraft position and pose estimation pipeline 400 also outputs an aircraft model projection 424. The boom tip position and pose estimation pipeline 600 outputs a boom tip position 622 (a position and pose of a boom), for example, in 6DoF. In some examples, the boom tip position and pose estimation pipeline 600 also outputs a boom model projection 624. The fuel receptacle position 422 and the boom tip position 622 are provided to a tracking logic 302 that determines a distance 304 between the boom tip 106 and the fuel receptacle 116, which are both shown in FIG. 2B.

The tracking logic 302 determines boom control parameters 308, which are provided to a boom control 310 that autonomously moves the aerial refueling boom 104 to position the boom tip 106 to engage the fuel receptacle 116. That is, boom control 310 controls the aerial refueling boom 104 to engage the fuel receptacle 116. In some examples, the tracking logic 302 also determines whether controlling the aerial refueling boom 104 to engage the fuel receptacle 116 is within safety parameters 306, and if not, generates an alert 316. Boom control parameters 308, as used herein include variables that describe how the aerial refueling boom 104 can move (e.g., roll, pitch, yaw, telescope, extend, retract, pivot, rotate, and the like) and may include limits and rates of such movement. Boom control parameters 308 may control the aerial refueling boom 104 given constraints of the boom pivot position and camera intrinsic and extrinsic parameters, for example, how to rotate the aerial refueling boom 104 (roll and pitch) and telescopically extend the aerial refueling boom 104.

In some examples, the aircraft model projection 424 and/or the boom model projection 624 are provided to a video compilation 312 that overlays the aircraft model projection 424 and/or the boom model projection 624 onto the video frame 200 to produce an overlay image 320. In some examples, the overlay image 320 and/or the alert 316 are provided to a human operator 314 over presentation components 906 (e.g., by displaying the overlay image 320 on a video monitor screen). In some examples, the human operator 164 uses input/output (I/O) components 910 (e.g., a joystick, mouse, keyboard, touchscreen, keypad, and/or other input devices) to provide boom control parameters 308 to control the aerial refueling boom 104 to position the boom tip 106 to engage the fuel receptacle 116.

Figure 4:
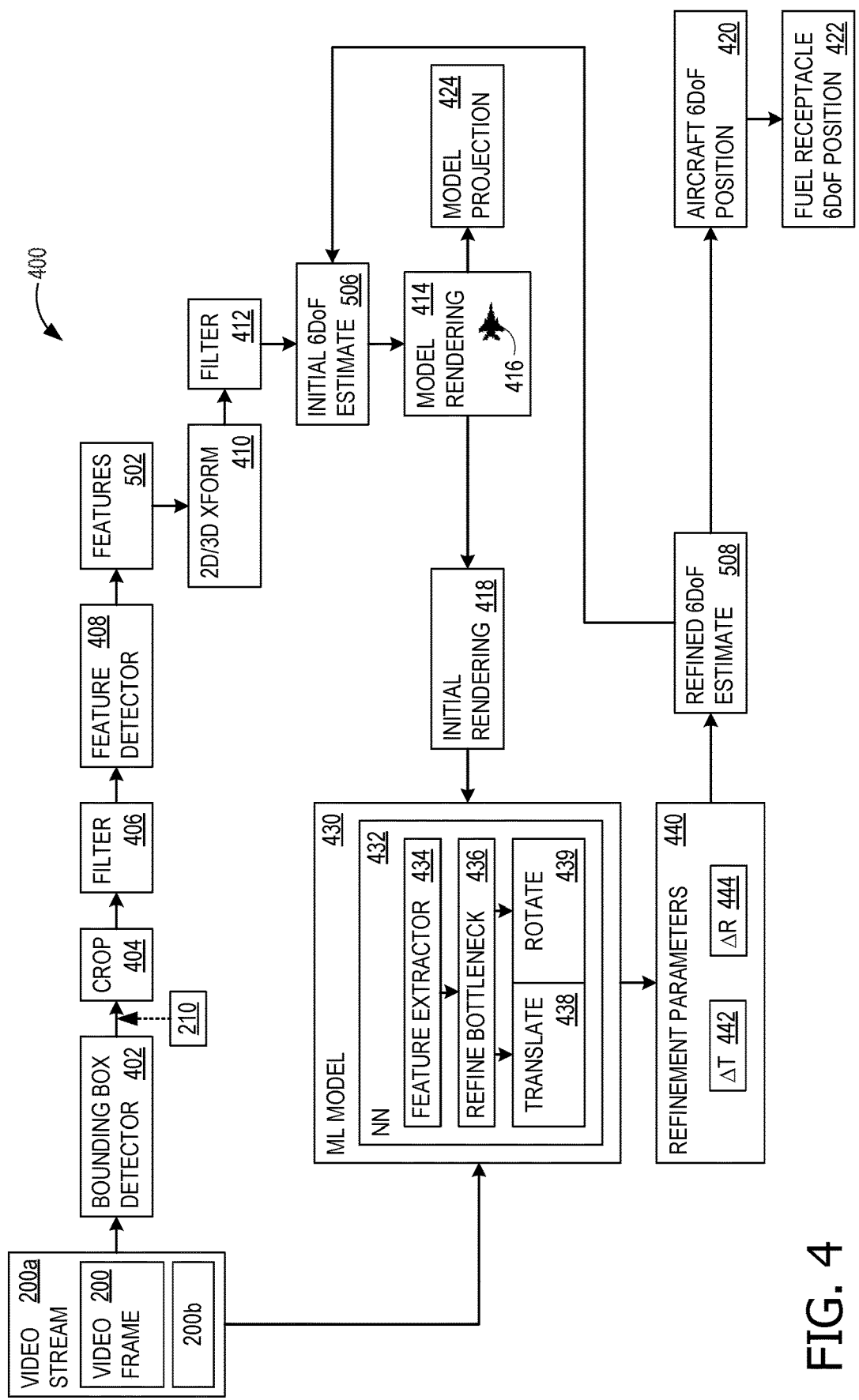
FIG. 4 illustrates a block diagram of an aircraft position and pose estimation pipeline 400, in accordance with an example.

FIG. 4 illustrates a block diagram of the aircraft position and pose estimation pipeline 400, which comprises a portion of the architecture 300. The video frame 200 is provided to an aircraft bounding box detector 402 that determines the aircraft bounding box 210. In some examples, the aircraft bounding box detector 402 comprises an NN, for example a deep CNN. In some examples, the aircraft bounding box detector 402 crops the video frame 200 to the area corresponding to the aircraft bounding box 210, to produce a cropped image 404. With cropping, later stages may neglect unnecessary sections of the video frame 200 by taking only the contents of the enclosing rectangle as input. Using just the area of interest also helps decrease computational time and allows use of more computationally intensive algorithms in later stages of the aircraft position and pose estimation pipeline 400.

In some examples, a filter 406 filters the video data, for example using a Kalman filter. Kalman filtering uses a series of measurements observed over time, containing statistical noise and other inaccuracies, and produces estimates of unknown variables that tend to be more accurate than those based on a single measurement alone, by estimating a joint probability distribution over the variables for each timeframe. Thus, in some examples, the filter 406 operates across video frames (e.g., the video frame 200 and the plurality of additional video frames 200b).

Figure 5B:
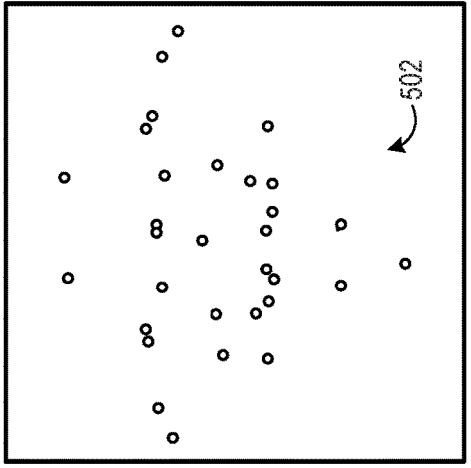
FIGS. 5A, 5B, 5C, and 5D illustrate notional feature extraction results, in accordance with an example.
Figure 5D:
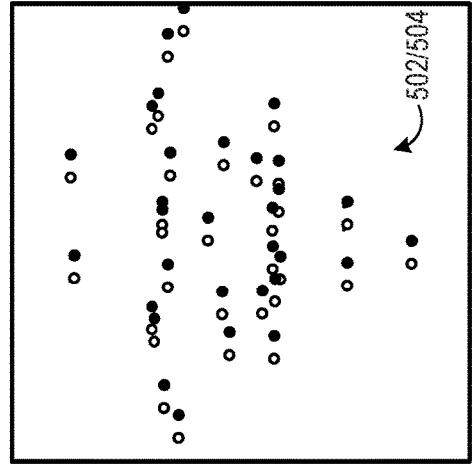
Figure 5A:
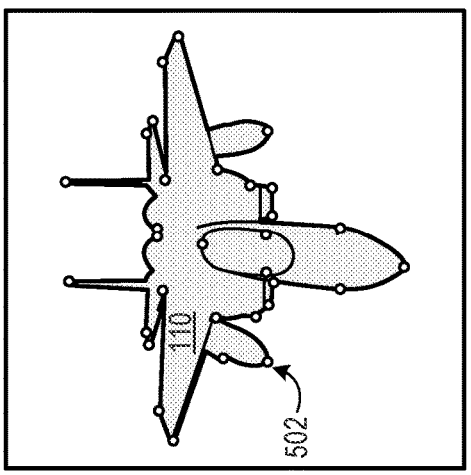

The output of the filter 406 is provided to an aircraft feature detector 408, which output aircraft features 502 (shown in FIGS. 5A and 5B). In some examples, the aircraft feature detector 408 comprises a keypoint detector, which may be implemented using a NN, for example a ResNet. Keypoint detection identifies the locations in video frames of points on a 3D object which may be used for 6DOF pose estimation. Keypoints may be chosen as consistently recognizable locations on the 3D object such as wingtips on an aircraft.

The aircraft features 502 are provided to an aircraft 2D to 3D transform 410. In some examples, the aircraft 2D to 3D transform 410 uses a perspective-n-point (PnP) algorithm. PnP algorithms estimate the pose of a calibrated camera relative to an object, given a set of N 3D points on the object and their corresponding 2D projections in an image collected by the camera. In some examples, the PnP algorithm leverages the correspondences between the 2D pixel locations of detected keypoints and 3D keypoint locations on a 3D aircraft model 416 to rotate and position the aircraft model 416 such that a simulated camera's view of the 3D keypoints matches the 2D pixel locations of detected keypoints.

The aircraft 2D to 3D transform 410 uses the known angles, extrinsics, and geometry of an object at each time instance to capture its world position. Camera parameter information may be used, which includes the parameters used in a camera model to describe the mathematical relationship between the 3D coordinates of a point in the scene from which the light comes and the 2D coordinates of its projection onto the image plane. Intrinsic parameters, also known as internal parameters, are the parameters intrinsic to the camera itself, such as the focal length and lens distortion. Extrinsic parameters, also known as external parameters or camera pose, are the parameters used to describe the transformation between the camera and its external world. The camera extrinsic information, resolution, magnification, and other intrinsic information are known.

The aircraft 2D to 3D transform 410 determines a raw aircraft position that is filtered by a filter 412 to produce an initial position estimate 506 (represented by dashed lines in FIGS. 5C-5E, 5G, and 5H), for example in 6DoF. The initial position estimate 506 in 6DoF is a combination of an initial 3D position estimate and an initial 3D pose estimate for the aircraft 110. The initial rendering 418 and the aircraft model projection 424 are generated by rendering the aircraft model 416 with a model rendering component 414, according to the initial position estimate 506. The initial rendering 418 is a solid image with a background, and is suitable for feature extraction, whereas the aircraft model projection 424 is suitable for overlaying with another image (e.g., from the video frame 200), such that the portion of the other image that is not obscured by the aircraft model rendering is still visible in the overlay image.

The initial rendering 418 is sent to a machine learning (ML) model 430 that includes an NN 432. In some examples, the NN 432 comprises a residual NN, for example an NN with 50 layers, such as a ResNet50. The NN 432 has a feature extraction function 434, a refinement bottleneck 436, a translation refinement head 438, and a rotation refinement head 439. The output refinement parameters 440 include a translation refinement 442 and a rotational refinement 444. The refined position estimate 508 is determined by applying the refinement parameters 440 to the initial position estimate 506 as indicated in Equation 1 for translation refinement and Equation 2 for rotational refinement:

$$T_{refined} = T_{estimate} + \Delta T \qquad \text{Equation 1}$$

$$R_{refined} = \Delta R * R_{estimate} \qquad \text{Equation 2}$$

where $T_{estimate}$ is the 3D position portion of the initial position estimate 506, $R_{estimate}$ is the 3D pose portion of the initial position estimate 506, $\Delta T$ is the translation refinement 442, $\Delta R$ is the rotational refinement 444, $T_{refined}$ is the 3D position portion of the refined position estimate 508, and $R_{refined}$ is the 3D pose portion of the refined position estimate 508. The NN 432 does not directly calculate the refined position estimate 508, but rather determines the shifts ($\Delta T$ and $\Delta R$) that are applied to the initial position estimate 506.

The fuel receptacle position 422 in 6DoF may be determined from the aircraft position 420 in 6DoF. That is, once the aircraft position 420 is known, the fuel receptacle position 422, which is in a predetermined location on the aircraft 110, can be determined. In some examples, the aircraft position 420 and/or the fuel receptacle position 422 is further filtered with a Kalman filter (which filters in time across video frames).

Further detail of an example implementation is provided, which was shown to achieve a 23.1% improvement in position and 12.2% improvement in the attitude (pose). A deep-learning based training method and algorithm refine a 6DoF pose estimate of an object (e.g., the aircraft 110) as it is captured by a monocular camera (e.g., the camera 108). The 6D pose parameters refer to three position parameters defining where the object is located in 3D space, and three pose (orientation) parameters defining how the object is rotationally-oriented. The input includes: an initial 6DoF estimate of the object (e.g., the initial position estimate 506); an image from at least one monocular visual camera (e.g., the video frame 200) of the object from which the initial 6DoF estimate of the object is derived; and a 3D triangular mesh model of the object (e.g., the aircraft model 416). The output is a refined version (e.g., the refined position estimate 508) of the initial 6DoF estimate of the object.

The process learns pose parameter differentials in order to transform the initial pose estimate to the refined pose estimate. Learning the pose differentials makes the process more agnostic to varying coordinate systems and other variable extrinsic parameters, such as camera and object placement. This allows the network to perform better in applications of aerial refueling, where the object of interest (an aircraft to be refueled) can be captured anywhere within the frame of the image, and it is often clipped off the side of the image. This is because the dimensionality of the solution space is reduced from an entire 3D space to a space representing the offset between the initial and refined estimates, making training more tractable.

Thus, this process is robust to imperfect video capture scenarios, such as when a portion of the object is cropped from the input image. The practical function is to refine (improve) low-confidence 6DoF pose estimates. The refiner (e.g., the ML model 430) is a lightweight model that can be appended to a pipeline that outputs initial 6DoF pose estimates for objects in other use cases (e.g., vehicles, pedestrians) for self-driving applications, and may also be used for improved positioning and mapping of fixed world objects (e.g., buildings, road signs, other markings) and making virtual reality (VR) systems more realistic and accurate.

For training, the original image (the video frame 200) and the rendering (e.g., the initial rendering 418) are pre-processed in multiple steps: (1) The object is cropped with respect to the initial pose estimate. The cropping begins as a tight crop. Once the longer side is found, the shorter side is extended to include more of the background. If the longer side extends beyond the entirety of the shorter side, then the shorter side is fully extended to its maximum length. (2) Black padding is added, if necessary, to make the images square, and the images are resized to fit the desired processing tools. (3) Data augmentations are applied to the cropped, resized image, independently with a probability of 70% respectively: brightness contrast, hue contrast, Gaussian noise, and random sun flare. (4) The images are normalized by, after making sure the pixel values are in the range [0, 1], removing the mean components and dividing by the standard deviation components for the three image channels.

The 6D pose of the renderings is used as the ground truth. Training images (representing initial position estimates) are generated by perturbing the ground truth by injecting Gaussian noise to produce errors up to about one foot. The perturbed ground truths emulate initial 6DoF position estimates. Another rendering is made based on each perturbed pose. The perturbed rendering is set against a black background, and a binary mask is made from the object model.

The pre-processed rendering and original image are fed into two parallel paths in the first phase of the refiner (e.g., the feature extraction function 434). A ResNet50 is used with building blocks that have a bottleneck design. Instead of using 2 layers for each building block that makes a residual function, the bottleneck design uses a stack of 3 layers. For each bottleneck building block, the three layers are 1×1, 3×3, and 1×1 convolutions: the first 1×1 decreases the depth of the input, the 3×3 serves as a bottleneck that preserves the depth, and the second 1×1 increases the depth to its original amount before entering the building block. The bottleneck architecture also uses identity shortcuts, which essentially add the original bottleneck input to the bottleneck's output, before going to the next building block.

Overall, the ResNet50 is composed of 1 maxpool layer, 16 bottleneck building blocks (48 convolutional layers total), and 1 average pool layer. Each of the parallel paths in the feature extraction block consists of the maxpool layer followed by the first 3 bottlenecks of the pre-trained ResNet50 network, accounting for the first 10 layers of the ResNet50. The outputs of the two parallel paths are subtracted from each other in order to find the key differences between the extracted high-level features in the rendering and original image, respectively. This difference enters a refinement bottleneck (e.g., the refinement bottleneck 436).

The refinement bottleneck is composed of the last 13 bottlenecks and the average pool layer of the pre-trained ResNet50 network, accounting for the last 40 layers of the ResNet50. The feature extraction's final output (the difference between the two parallel paths) serves as the input to the refinement bottleneck. The refinement bottleneck's output consists of 2,048 features.

There are two refinement heads: a translation refinement head 438 (e.g., the translation refinement head 438) and a rotation refinement head (e.g., the rotation refinement head 439). The refinement head outputs are differentials, which are the shifts that are applied to the initial pose estimate's translation and rotation, respectively. See Equations 1 and 2 above. The network initially outputs ΔR as a rotation quaternion $\Delta R_q$, which is converted to a rotation matrix using extrinsic coordinates.

The translation and rotation are pre-processed such that they are disentangled from one another. For the translation vector, the x- and y-directions are in the image space, so they are used them to learn the number of pixels needed to shift the object. The z-direction is in the camera space, providing learning on how much scaling of the object is needed. The rotation is in the camera space, but centered in the model space, so it is not only agnostic to the coordinate system it is in, but also applies the rotation in place. Thus, the rotation does not affect the current center of gravity of the object, and there is no self-correction needed in the translation to return to the original position. Thus, after the translation is applied, the rotation is done in place and does not shift the center of the object.

The initial pose estimate values (in world space) are initialized for disentanglement. For translation, the initial translation estimation from the world space to the image plane gives x- and y-directions in the image space. The original translation vector from the world space is projected into the camera space using the camera's matrix (composed of camera's basis and origin). The first value from the output vector is the z-direction in the camera space. The initial rotation estimate is converted to a rotation matrix, if it is not already. The inverse of the camera's basis is multiplied by the rotation matrix.

The refinement bottleneck's output is used in two different paths. The paths corresponds to the two refinement heads: the translation refinement head and the rotation refinement head, each of which consists of three fully-connected layers. In both cases, the first layer takes 2,048 features and outputs 512 features, followed by a batch normalization and a rectified linear unit (ReLU) activation layer; the second layer takes 512 features and outputs 256 features, followed by a batch normalization and a ReLU activation layer. The difference between the two refinement heads becomes manifest in the third fully-connected layer. The translation refinement head takes 256 features and outputs 3 features, whereas the rotation refinement head outputs 4 features. The translation head is learning the x, y, and z directions (hence, 3 outputs), whereas the rotation head is learning the rotation quaternion (hence, 4 outputs). At the end of the rotation refinement head, a post-processing normalization layer follows the third fully-connected layer, because quaternions must have a unit norm of 1.

The first two fully-connected layers of each refinement head are randomly initialized using the Kaiming uniform distribution. The third fully-connected layer for the translation refinement head is initialized as an all-zero matrix, so that it outputs 3 zeros before training begins. This ensures that our starting point in the refined translation is the initial estimate. The rotation refinement head is similarly initialized. The third fully-connected layer for the rotation refinement head is a matrix with all values set to zero, except for the last column, which is all ones. This is because, if the third fully-connected layer is all zeros, the post-processing normalization layer that follows would not be able to normalize the output (which would be an all-zero matrix). With this setup, the normalization layer in the post-processing will result in a quaternion differential of [0, 0, 0, 1] which corresponds to the identity rotation matrix differential $I_3$.

Figure 5C:
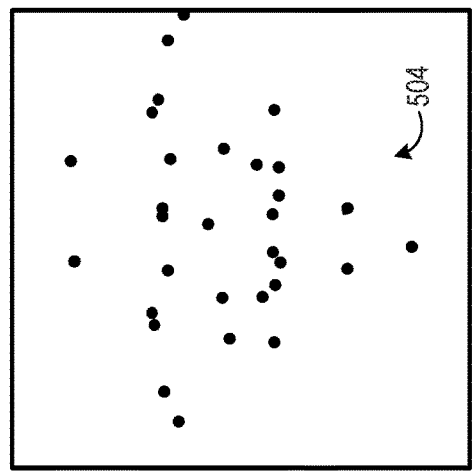

FIG. 5A shows the aircraft 110 with the extracted aircraft features 502 (white-filled circles) for the aircraft 110, extracted from the video frame 200 (or another video frame of the video stream 200a). For clarity, the aircraft features 502 are shown without the aircraft 110, in FIG. 5B. FIG. 5C shows the extracted rendering features 504 (black-filled circles) for from the initial rendering 418. FIG. 5D shows the aircraft features 502 (from the video frame 200) with the rendering features 504 (from the initial rendering 418) with displacement (differences in position) apparent. The displacement reflects the error in the initial position estimate 506 that is to be reduced in the refined position estimate 508.

Figure 5F:
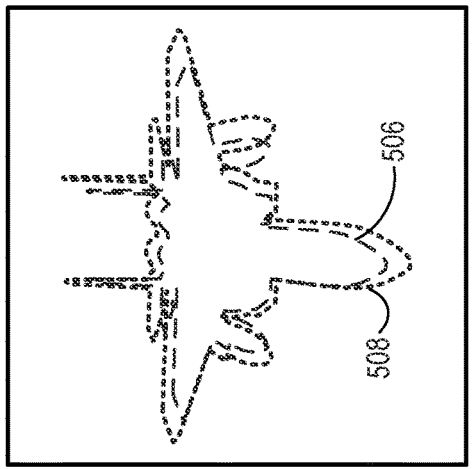
FIGS. 5E, 5F, and 5G illustrate translation and rotation for position and pose estimation refinement, in accordance with an example.
Figure 5E:
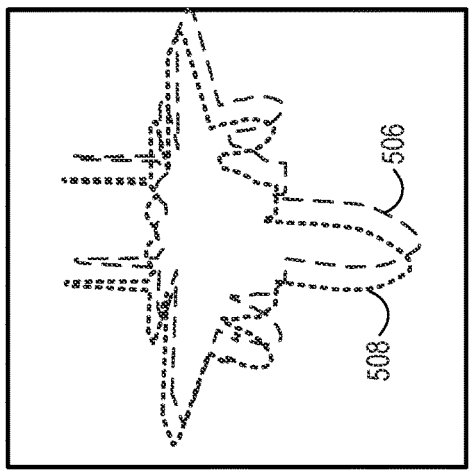
Figure 5G:
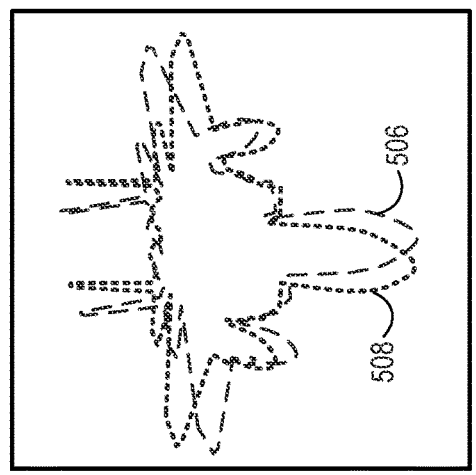
Figure 5H:
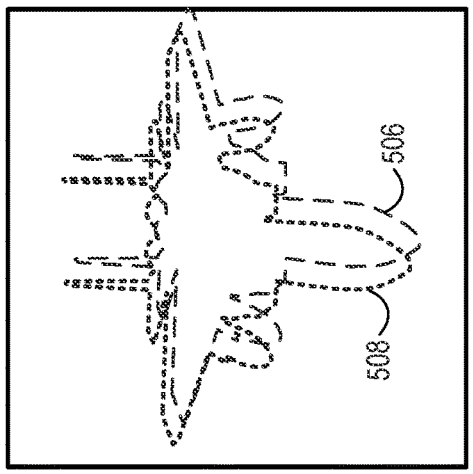
FIGS. 5H, 5I, and 5J illustrate position and pose estimation refinement the aircraft 110, in accordance with an example.
Figure 5I:
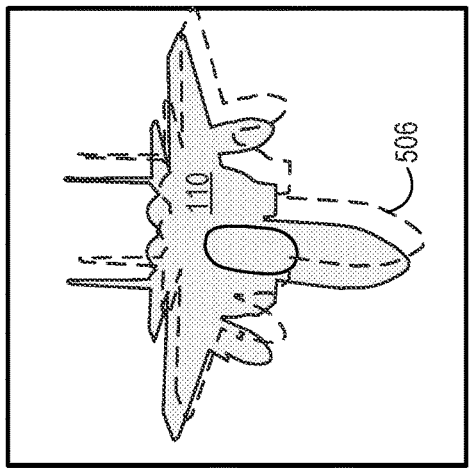
Figure 5J:
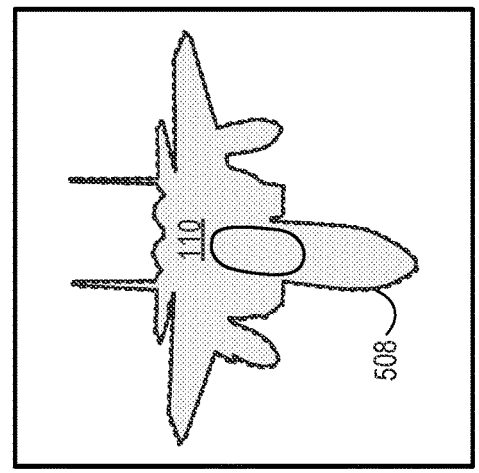

FIG. 5E illustrates translation refinement in two-dimensional (2D) space, corresponding to x-y-image space, in which the refined position estimate 508 is shifted laterally relative to the initial position estimate 506. In some examples, the translation refinement is 3D, which is in the z-axis direction (when the 2D image space corresponds to x-y axes). This results in scaling in the image space of the initial position estimate 506 into the size of the refined position estimate 508 (as the position estimate moves closer to the virtual camera in the rendering), and is shown in FIG. 5F. FIG. 5G illustrates rotational refinement, in which the refined position estimate 508 is rotated relative to the initial position estimate 506. It should be understood that rotational refinement is 3D rotation (roll, pitch, and yaw). FIG. 5H shows the aircraft 110 with the initial position estimate 506, FIG. 5I shows the initial position estimate 506 with the refined position estimate 508, and FIG. 5J shows the aircraft 110 with the refined position estimate 508.

Figure 6:
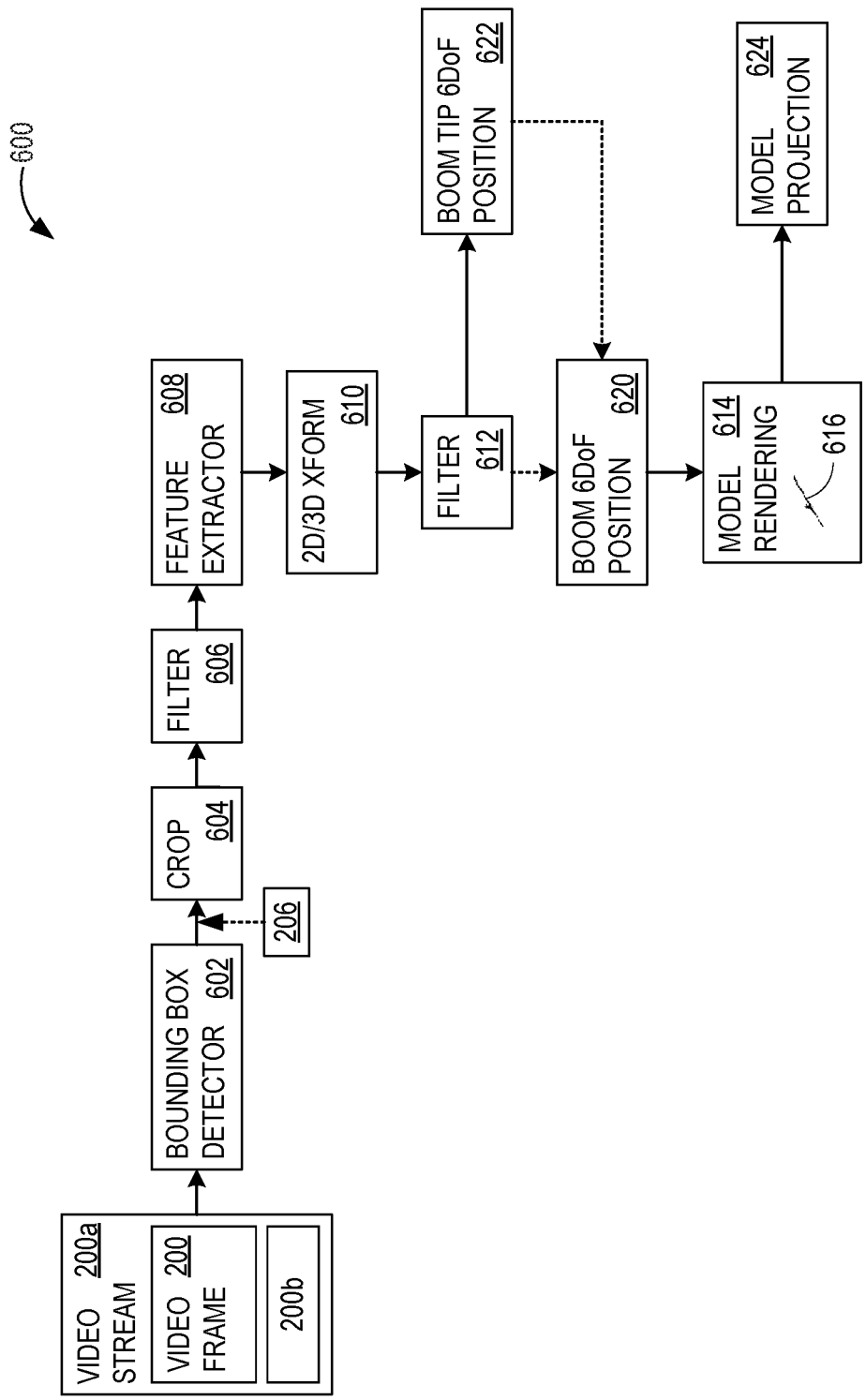
FIG. 6 illustrates a block diagram of a boom tip position and pose estimation pipeline 600, in accordance with an example.

FIG. 6 illustrates a block diagram of a boom tip position and pose estimation pipeline 600. The video frame 200 is provided to a boom tip bounding box detector 602 that determines the boom tip bounding box 206. In some examples, the boom tip bounding box detector 602 crops the video frame 200 to the area corresponding to the boom tip bounding box 206, to produce a cropped image 604. In some examples, a filter 606 filters the video data, for example using a Kalman filter operating across video frames (e.g., the video frame 200 and the plurality of additional video frames 200b).

In some examples, the boom tip bounding box detector 602 comprises an NN, for example a deep CNN. The output of the boom tip bounding box detector 602 (cropped and/or filtered, in some examples), is provided to a boom tip feature extractor 608. In some examples, the boom tip feature extractor 608 comprises a keypoint detector implemented using an NN, for example a ResNet. The boom tip feature extractor 608 outputs a boom tip feature map that is provided to a boom tip 2D to 3D transform 610. The boom tip 2D to 3D transform 610 determines the boom tip position 622, for example, in 6DoF, which, in some examples, is filtered with a filter 612.

In some examples, the boom tip 2D to 3D transform 610 also determines boom position 620, which is the position of the aerial refueling boom 104 in 6DoF. In some examples, boom position 620 is determined using the boom tip position 622 (for the distal end of the aerial refueling boom 104) and the knowledge that the proximal end of the aerial refueling boom 104 is located at a fixed position on the refueling platform 102. The boom model projection 624 is generated by rendering a 3D refueling boom model 616 with a model rendering component 614, according to the boom position 620.

Figure 7:
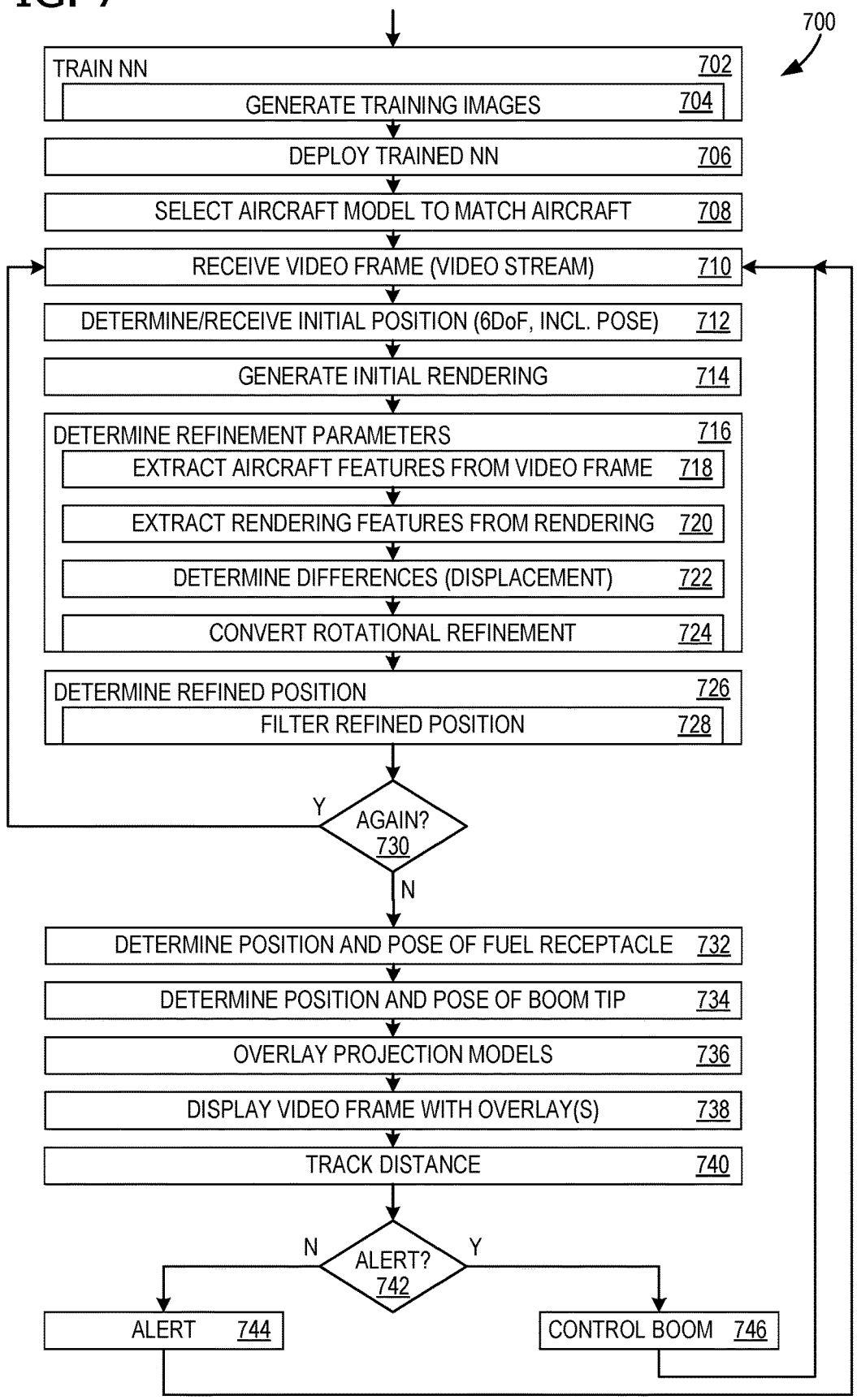
FIG. 7 is a flowchart 700 illustrating a method of position and pose estimation for aerial refueling, as can be used with the arrangement 100 of FIG. 1, in accordance with an example.

With reference now to FIG. 7, a flowchart 700 illustrates a method of aerial refueling (for example, a method of position and pose estimation for aerial refueling). In some examples, the operations illustrated in FIG. 7 are performed, at least in part, by executing instructions 902a (stored in the memory 902) by the one or more processors 904 of the computing device 900 of FIG. 9. For example, the NN 432 may be trained on a first example of the computing device 900 and then deployed on a second (different) example of the computing device 900. Operations 702 and 704 are performed prior to deployment in operation 706, to train the NN 432.

Operation 702 includes training the NN 432 to detect pose parameter differences between an image (e.g., in the video frame 200) of the aircraft 110 and a rendering of the aircraft model 416. In some examples, the NN 432 comprises a residual NN. In some examples, the NN 432 comprises a residual NN with 50 layers, (e.g., ResNet50). In some examples, the NN 432 comprises a maxpool layer, a plurality of bottleneck building blocks, and an average pool layer. Operation 704, which is a part of operation 702, includes generating training images for the NN 432 using a simulator that sweeps the aircraft model 416 through various 6DoF values to produce a set of aircraft images and aircraft ground truth data, and labeling the aircraft images using the aircraft ground truth data. The NN 432 is trained using the training images, and the trained NN 432 is deployed in operation 706.

Operation 708 includes selecting the aircraft model 416 based on at least the aircraft 110 to be refueled. This may leverage refueling scheduling information, user input, or automatic object recognition of the aircraft 110. In some examples, the aircraft model 416 comprises a 3D triangular mesh model. Operation 710 includes receiving the video stream 200a comprising the video frame 200 and a plurality of additional video frames (e.g., receiving the video frame 200 showing the aircraft 110 to be refueled). In some examples, the video frame 200 is provided by a single camera (e.g., the camera 108). In some examples, the video frame 200 is monocular.

Operation 712 includes receiving the initial position estimate and the initial pose estimate (together, the initial position estimate 506) for the aircraft 110. A position and a pose estimate together comprise a six-degrees of freedom (6DoF) position. In some examples, the initial position estimate 506 is received from portions of the aircraft position and pose estimation pipeline 400. The aircraft position and pose estimation pipeline 400 determines the initial position estimate and the initial pose estimate based on at least the video frame 200 showing the aircraft 110 or a prior video frame (e.g., one of the plurality of additional video frames 200*b*) showing the aircraft 110. In some passes through the flowchart 700, the initial position estimate 506 is determined using stages 402-412 of the aircraft position and pose estimation pipeline 400. This may occur when the aircraft 110 is first encountered, or upon some trigger condition to reset the position estimate. In some passes through the flowchart 700, for example, if a previously-determined value of the refined position estimate 508 is available (e.g., the refueling operation has been ongoing for a while and the video stream 200*a* has a history of images of the aircraft 110) the determination of the initial position estimate 506 uses the prior refined position estimate 508. This prior refined position estimate 508 will have been determined during a prior pass through operation 726, described below.

Operation 714 includes, based on at least the initial position estimate 506 (e.g., the initial 3D position estimate and the initial 3D pose estimate), generating the initial rendering of the aircraft model 416. Operation 716, which is performed using operations 718-724, determines the refinement parameters 440 for the initial position estimate 506, based on at least the video frame 200 and the initial rendering 418 of the aircraft model 416. In some examples, the refinement parameters 440 comprise the translation refinement 442 and the rotational refinement 444. In some examples, determining the refinement parameters 440 uses the NN 432. Some examples of arrangement 100 are able to determine the refinement parameters 440 even when a portion of the aircraft 110 is not visible within the video frame 200.

Operation 718 extracts features (e.g., the aircraft features 502) from the video frame 200, and operation 720 extracts features (e.g., the rendering features 504) from the initial rendering 418 of the aircraft model 416. Operation 722 determines differences between features the aircraft features 502 from the video frame 200 and the rendering features 504 extracted from the initial rendering 418 of the aircraft model 416. Operation 724 converts the rotational refinement 444 from a rotation quaternion to a rotation matrix.

Operation 726 includes, based on at least the initial position estimate 506 (e.g., the initial 3D position estimate and the initial 3D pose estimate) and the refinement parameters 440, determining a refined 3D position estimate and a refined 3D pose estimate (together, the refined position estimate 508) for the aircraft 110. Some examples include filtering the refined position estimate 508, in operation 728, as part of operation 726. In some examples, filtering the refined position estimate 508 uses a Kalman filter. Some examples iterate through operations 710-728 multiple times prior to proceeding, with the refined position estimate 508 becoming the new version of the initial position estimate 506 in operation 712.

A decision operation 730 determines whether to pass through operations 710-728 again, or whether the desired count if iterations has been reached. This process iteratively generates successively refined position estimates 508 prior to determining the 3D position and 3D pose of the fuel receptacle 116 (together the fuel receptacle position 422, which is a 6DoF position). When operations 712-728 iterate faster than the frame rate of the camera 108, and a new video frame has not yet been received, operations 712-728 may iterate using the same video frame 200.

When the flowchart 70 continues, operation 732 includes, based on at least the refined position estimate 508 for the aircraft 110, determining the fuel receptacle position 422 on the aircraft 110. Operation 734 determines the position and pose of the boom tip 106 (e.g., the boom tip position 622 in 6DoF) of the aerial refueling boom 104. Operation 736 generates the overlay image 320. The overlay image 320 comprises the aircraft model projection 424, which is based on at least the aircraft model 416 and the refined position estimate 508, and the video frame 200 showing the aircraft 110 or a subsequent video frame showing the aircraft 110. In some examples, the overlay image 320 also comprises the boom model projection 624, which is based on at least the refueling boom model 616 and the boom tip position 622. The overlay image 320 is displayed in operation 738.

Operation 740 tracks the distance 304 between the boom tip 106 and the fuel receptacle 116. A decision operation 742 determines whether controlling the aerial refueling boom 104 to engage the fuel receptacle 116 is within the safety parameters 306, based on at least the fuel receptacle position 422 and the boom tip position 622. If not within the safety parameters 306, operation 744 includes, based on at least determining that controlling the aerial refueling boom 104 to engage the fuel receptacle 116 is not within safety parameters 306, generating the alert 316.

Otherwise, operation 746 includes, based on at least the fuel receptacle position 422, controlling the aerial refueling boom 104 to engage the fuel receptacle 116. Controlling the aerial refueling boom 104 to engage the fuel receptacle 116 comprises controlling the aerial refueling boom 104 to engage the fuel receptacle 116 based on at least the fuel receptacle position 422 and the boom tip position 622. The flowchart 700 then returns to operation 710.

Figure 8:
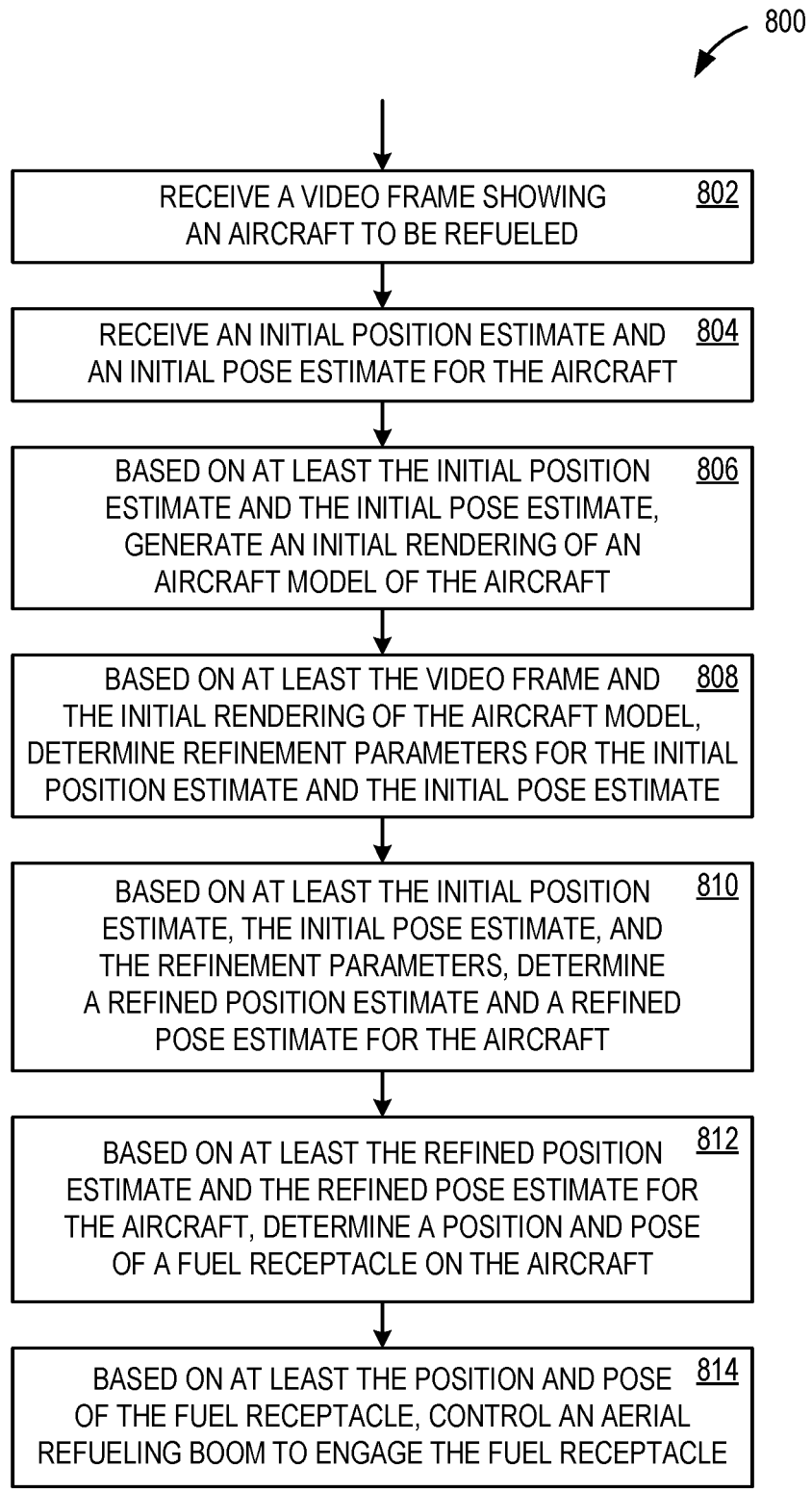
FIG. 8 is a flowchart 800 illustrating another method of fuel receptacle and boom tip position and pose estimation for aerial refueling, as can be used with the arrangement 100 of FIG. 1, in accordance with an example.

FIG. 8 shows a flowchart 800 illustrating a method of aerial refueling. In some examples, operations illustrated in FIG. 8 are performed, at least in part, by executing instructions by the one or more processors 904 of the computing device 900 of FIG. 9. Operation 802 includes receiving a video frame showing an aircraft to be refueled. Operation 804 includes receiving an initial position estimate and an initial pose estimate for the aircraft. Operation 806 includes, based on at least the initial position estimate and the initial pose estimate, generating an initial rendering of an aircraft model of the aircraft.

Operation 808 includes, based on at least the video frame and the initial rendering of the aircraft model, determining refinement parameters for the initial position estimate and the initial pose estimate. Operation 810 includes based on at least the initial position estimate, the initial pose estimate, and the refinement parameters, determining a refined position estimate and a refined pose estimate for the aircraft. Operation 812 includes based on at least the refined position estimate and the refined pose estimate for the aircraft, determining a position and pose of a fuel receptacle on the aircraft. Operation 814 includes based on at least the position and pose of the fuel receptacle, controlling an aerial refueling boom to engage the fuel receptacle.

Figure 9:
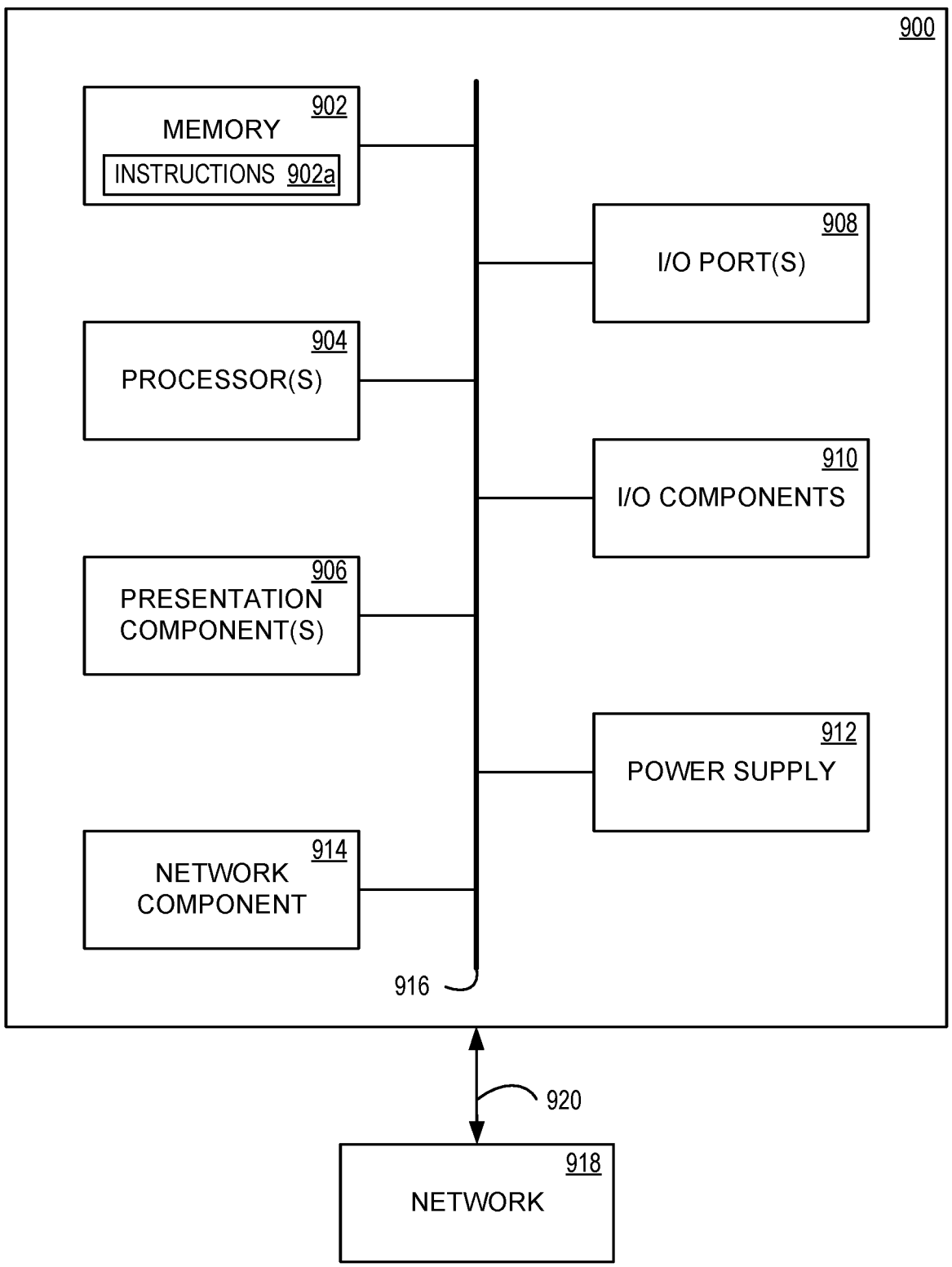
FIG. 9 is a block diagram of a computing device 900 suitable for implementing various aspects of the disclosure in accordance with an example.

With reference now to FIG. 9, a block diagram of the computing device 900 suitable for implementing various aspects of the disclosure is described. In some examples, the computing device 900 includes one or more processors 904, one or more presentation components 906 and the memory 902. The disclosed examples associated with the computing device 900 are practiced by a variety of computing devices, including personal computers, laptops, smart phones, mobile tablets, hand-held devices, consumer electronics, specialty computing devices, etc. Distinction is not made between such categories as "workstation," "server," "laptop," "handheld device," etc., as all are contemplated within the scope of FIG. 9 and the references herein to a "computing device." The disclosed examples are also practiced in distributed computing environments, where tasks are performed by remote-processing devices that are linked through a communications network. Further, while the computing device 900 is depicted as a seemingly single device, in one example, multiple computing devices work together and share the depicted device resources. For instance, in one example, the memory 902 is distributed across multiple devices, the processor(s) 904 provided are housed on different devices, and so on.

In one example, the memory 902 includes any of the computer-readable media discussed herein. In one example, the memory 902 is used to store and access instructions 902a configured to carry out the various operations disclosed herein. In some examples, the memory 902 includes computer storage media in the form of volatile and/or nonvolatile memory, removable or non-removable memory, data disks in virtual environments, or a combination thereof. In one example, the processor(s) 904 includes any quantity of processing units that read data from various entities, such as the memory 902 or input/output (I/O) components 910. Specifically, the processor(s) 904 are programmed to execute computer-executable instructions for implementing aspects of the disclosure. In one example, the instructions are performed by the processor, by multiple processors within the computing device 900, or by a processor external to the computing device 900. In some examples, the processor(s) 904 are programmed to execute instructions such as those illustrated in the flowcharts discussed below and depicted in the accompanying drawings.

The presentation component(s) 906 present data indications to an operator or to another device. In one example, presentation components 906 include a display device, speaker, printing component, vibrating component, etc. One skilled in the art will understand and appreciate that computer data is presented in a number of ways, such as visually in a graphical user interface (GUI), audibly through speakers, wirelessly between the computing device 900, across a wired connection, or in other ways. In one example, presentation component(s) 906 are not used when processes and operations are sufficiently automated that a need for human interaction is lessened or not needed. I/O ports 908 allow the computing device 900 to be logically coupled to other devices including the I/O components 910, some of which is built in. Implementations of the I/O components 910 include, for example but without limitation, a microphone, keyboard, mouse, joystick, game pad, satellite dish, scanner, printer, wireless device, etc.

The computing device 900 includes a bus 916 that directly or indirectly couples the following devices: the memory 902, the one or more processors 904, the one or more presentation components 906, the input/output (I/O) ports 908, the I/O components 910, a power supply 912, and a network component 914. The computing device 900 should not be interpreted as having any dependency or requirement related to any single component or combination of components illustrated therein. The bus 916 represents one or more busses (such as an address bus, data bus, or a combination thereof). Although the various blocks of FIG. 9 are shown with lines for the sake of clarity, some implementations blur functionality over various different components described herein.

In some examples, the computing device 900 is communicatively coupled to a network 918 using the network component 914. In some examples, the network component 914 includes a network interface card and/or computer-executable instructions (e.g., a driver) for operating the network interface card. In one example, communication between the computing device 900 and other devices occur using any protocol or mechanism over a wired or wireless connection 920. In some examples, the network component 914 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 900, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 10:
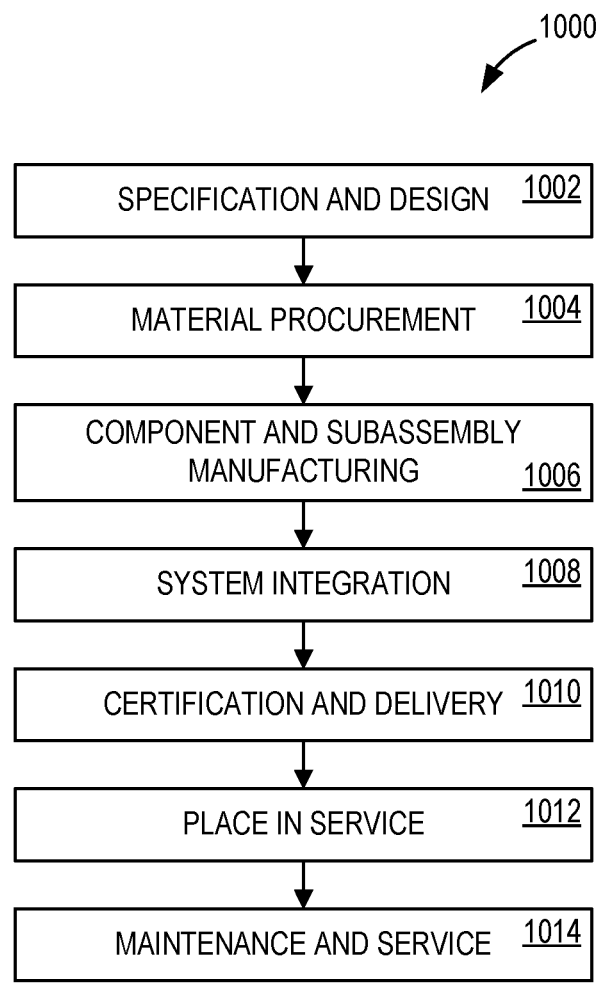
FIG. 10 is a block diagram of an apparatus production and service method 1000 that employs various aspects of the disclosure in accordance with an example.
Figure 11:
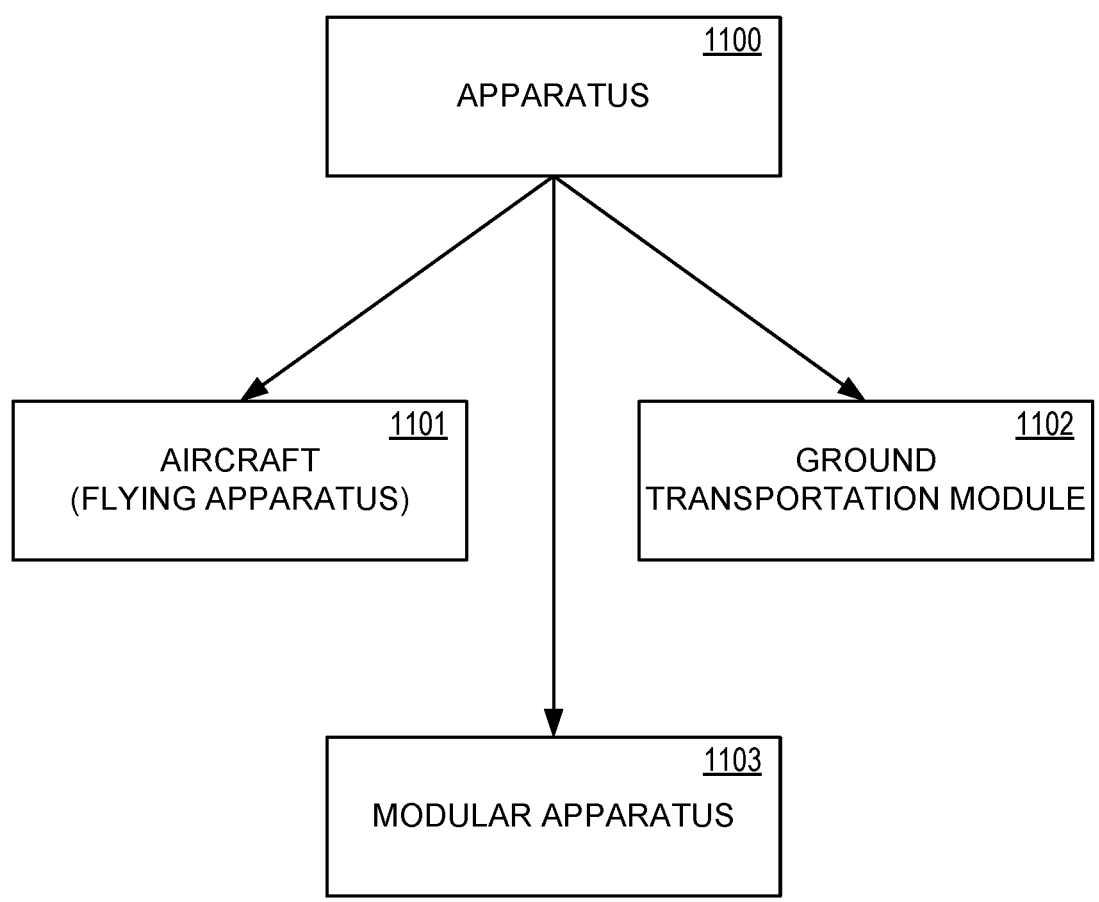
FIG. 11 is a block diagram of an apparatus 1100 for which various aspects of the disclosure may be advantageously employed in accordance with an example.
Figure 12:
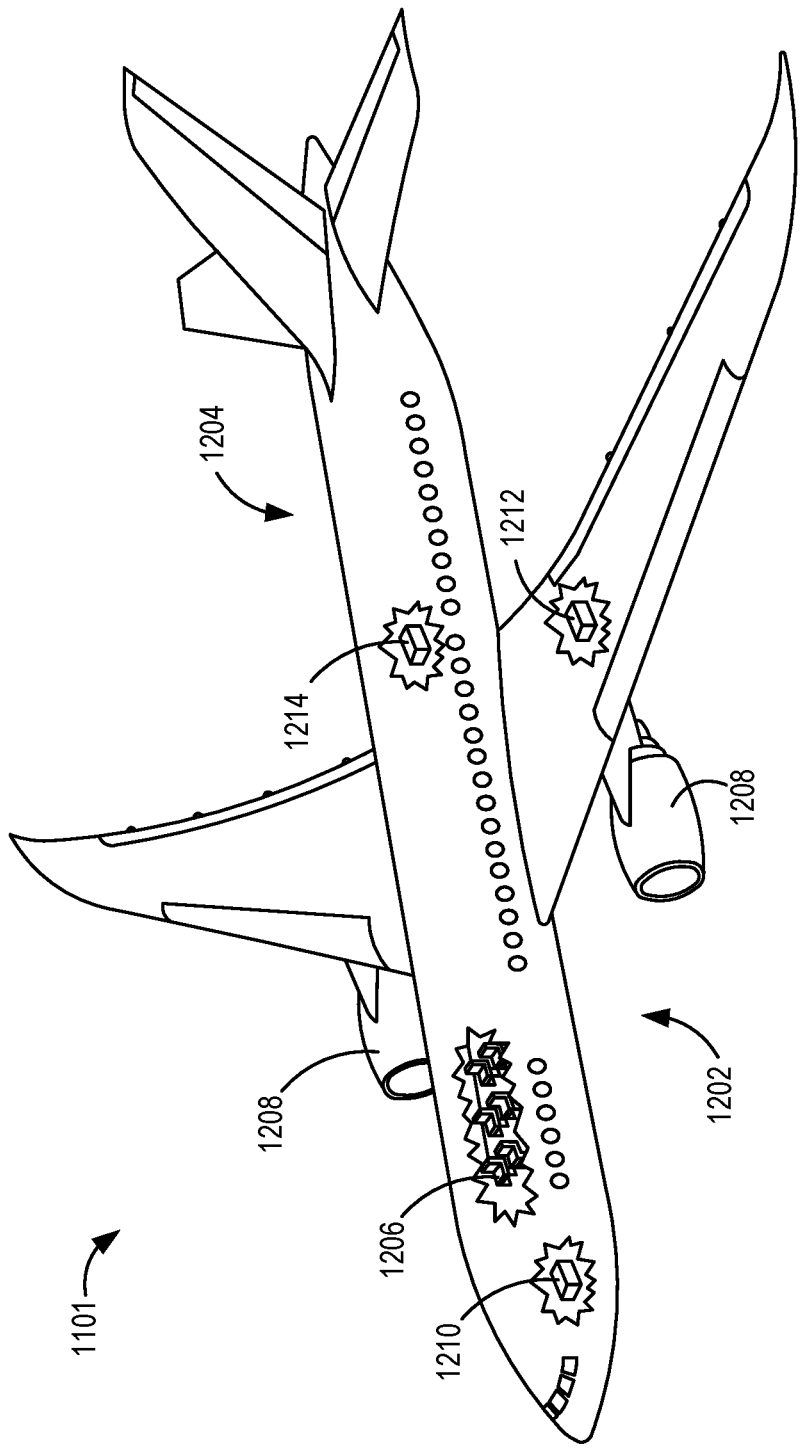
FIG. 12 is a schematic perspective view of a particular flying apparatus 1101 in accordance with an example.

Some examples of the disclosure are used in manufacturing and service applications as shown and described in relation to FIGS. 10-12. Thus, examples of the disclosure are described in the context of an apparatus of manufacturing and service method 1000 shown in FIG. 10 and apparatus 1100 shown in FIG. 11. In FIG. 11, a diagram illustrating an apparatus manufacturing and service method 1000 is depicted in accordance with an example. In one example, during pre-production, the apparatus manufacturing and service method 1000 includes specification and design 1002 of the apparatus 1100 in FIG. 11 and material procurement 1104. During production, component, and subassembly manufacturing 1006 and system integration 1008 of the apparatus 1100 in FIG. 11 takes place. Thereafter, the apparatus 1100 in FIG. 11 goes through certification and delivery 1010 in order to be placed in service 1012. While in service by a customer, the apparatus 1100 in FIG. 11 is scheduled for routine maintenance and service 1014, which, in one example, includes modification, reconfiguration, refurbishment, and other maintenance or service subject to configuration management, described herein.

In one example, each of the processes of the apparatus manufacturing and service method 1000 are performed or carried out by a system integrator, a third party, and/or an operator. In these examples, the operator is a customer. For the purposes of this description, a system integrator includes any number of apparatus manufacturers and major-system subcontractors; a third party includes any number of venders, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 11, the apparatus 1100 is provided. As shown in FIG. 11, an example of the apparatus 1100 is a flying apparatus 1101, such as an aerospace vehicle, aircraft, air cargo, flying car, satellite, planetary probe, deep space probe, solar probe, and the like. As also shown in FIG. 11, a further example of the apparatus 1100 is a ground transportation apparatus 1102, such as an automobile, a truck, heavy equipment, construction equipment, a boat, a ship, a submarine, and the like. A further example of the apparatus 1100 shown in FIG. 11 is a modular apparatus 1103 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

With reference now to FIG. 12, a more specific diagram of the flying apparatus 1101 is depicted in which an implementation of the disclosure is advantageously employed. In this example, the flying apparatus 1101 is an aircraft produced by the apparatus manufacturing and service method 1000 in FIG. 10 and includes an airframe 1202 with a plurality of systems 1204 and an interior 1206. Examples of the plurality of systems 1204 include one or more of a propulsion system 1208, an electrical system 1210, a hydraulic system 1212, and an environmental system 1214. However, other systems are also candidates for inclusion. Although an aerospace example is shown, different advantageous examples are applied to other industries, such as the automotive industry, etc.

The examples disclosed herein are described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples are practiced in a variety of system configurations, including personal computers, laptops, smart phones, mobile tablets, hand-held devices, consumer electronics, specialty computing devices, etc. The disclosed examples are also practiced in distributed computing environments, where tasks are performed by remote-processing devices that are linked through a communications network.

An example method of aerial refueling comprises: receiving a video frame showing an aircraft to be refueled; receiving an initial position estimate and an initial pose estimate for the aircraft; based on at least the initial position estimate and the initial pose estimate, generating an initial rendering of an aircraft model of the aircraft; based on at least the video frame and the initial rendering of the aircraft model, determining refinement parameters for the initial position estimate and the initial pose estimate; based on at least the initial position estimate, the initial pose estimate, and the refinement parameters, determining a refined position estimate and a refined pose estimate for the aircraft; based on at least the refined position estimate and the refined pose estimate for the aircraft, determining a position and pose of a fuel receptacle on the aircraft; and based on at least the position and pose of the fuel receptacle, controlling an aerial refueling boom to engage the fuel receptacle.

An example system for aerial refueling comprises: one or more processors; and a memory storing instructions that, when executed by the one or more processors, cause the one or more processors to perform operations comprising: receiving a video frame showing an aircraft to be refueled; receiving an initial position estimate and an initial pose estimate for the aircraft; based on at least the initial position estimate and the initial pose estimate, generating an initial rendering of an aircraft model of the aircraft; based on at least the video frame and the initial rendering of the aircraft model, determining refinement parameters for the initial position estimate and the initial pose estimate; based on at least the initial position estimate, the initial pose estimate, and the refinement parameters, determining a refined position estimate and a refined pose estimate for the aircraft;

based on at least the refined position estimate and the refined pose estimate for the aircraft, determining a position and pose of a fuel receptacle on the aircraft; and based on at least the position and pose of the fuel receptacle, controlling an aerial refueling boom to engage the fuel receptacle.

An example computer program product comprises a computer usable medium having a computer readable program code embodied therein, the computer readable program code adapted to be executed to implement a method of aerial refueling, the method comprising: receiving a video frame showing an aircraft to be refueled; receiving an initial position estimate and an initial pose estimate for the aircraft; based on at least the initial position estimate and the initial pose estimate, generating an initial rendering of an aircraft model of the aircraft; based on at least the video frame and the initial rendering of the aircraft model, determining refinement parameters for the initial position estimate and the initial pose estimate; based on at least the initial position estimate, the initial pose estimate, and the refinement parameters, determining a refined position estimate and a refined pose estimate for the aircraft; based on at least the refined position estimate and the refined pose estimate for the aircraft, determining a position and pose of a fuel receptacle on the aircraft; and based on at least the position and pose of the fuel receptacle, controlling an aerial refueling boom to engage the fuel receptacle.

Alternatively, or in addition to the other examples described herein, examples include any combination of the following:

- the video frame is provided by a single camera;
- the refinement parameters comprise a translation refinement and a rotational refinement;
- determining the initial position estimate and the initial pose estimate based on at least the video frame showing the aircraft or a prior video frame showing the aircraft;
- determining the initial position estimate using a prior refined position estimate;
- determining the initial pose estimate using a prior refined pose estimate;
- determining a position and pose of a boom tip of the aerial refueling boom;
- controlling the aerial refueling boom to engage the fuel receptacle comprises controlling the aerial refueling boom to engage the fuel receptacle based on at least the position and pose of the fuel receptacle and the position and pose of the boom tip;
- generating an overlay image comprising:
- the overlay image comprises a model projection, based on at least the aircraft model, the refined position estimate, and the refined pose estimate;
- the overlay image comprises the video frame showing the aircraft or a subsequent video frame showing the aircraft;
- displaying the overlay image;
- a boom control that controls the aerial refueling boom to engage the fuel receptacle;
- determining refinement parameters for the initial position estimate and the initial pose estimate comprises determining refinement parameters using an NN;
- the NN comprises a residual NN;
- the NN comprises a residual NN with 50 layers;
- the NN comprises a maxpool layer, a plurality of bottleneck building blocks, and an average pool layer;
- determining refinement parameters for the initial position estimate and the initial pose estimate comprises extracting features from the video frame;
- determining refinement parameters for the initial position estimate and the initial pose estimate comprises extracting features from the initial rendering of the aircraft model;
- determining refinement parameters for the initial position estimate and the initial pose estimate comprises determining differences between features extracted from the video frame and features extracted from the initial rendering of the aircraft model;
- determining refinement parameters for the initial position estimate and the initial pose estimate when a portion of the aircraft is not visible within the video frame;
- determining refinement parameters for the initial position estimate and the initial pose estimate comprises converting the rotational refinement from a rotation quaternion to a rotation matrix;
- the aircraft model comprises a three-dimensional (3D) triangular mesh model;
- a position and a pose estimate together comprise a six-degrees of freedom (6DoF) position;
- the video frame is monocular;
- receiving a video stream comprising the video frame and a plurality of additional video frames;
- filtering the refined position estimate and the refined pose estimate;
- filtering the refined position estimate and the refined pose estimate with a Kalman filter;
- iteratively generating refined position estimates and refined pose estimates prior to determining the position and pose of the fuel receptacle;
- selecting the aircraft model based on at least the aircraft to be refueled;
- tracking a distance between the boom tip and the fuel receptacle;
- based on at least the position and pose of the fuel receptacle and the position and pose of the boom tip, determining whether controlling the aerial refueling boom to engage the fuel receptacle is within safety parameters;
- based on at least determining that controlling the aerial refueling boom to engage the fuel receptacle is not within safety parameters, generating an alert;
- generating training images for the NN using a simulator that sweeps an aircraft model through various 6DoF values to produce a set of aircraft images and aircraft ground truth data, and labeling the aircraft images using the aircraft ground truth data;
- training the NN using the training images; and
- training the NN to detect pose parameter differences between an image of an aircraft and a rendering of an aircraft model.

When introducing elements of aspects of the disclosure or the implementations thereof, the articles "a," "an," "the," and "said" are intended to mean that there are one or more of the elements. The terms "comprising," "including," and "having" are intended to be inclusive and mean that there could be additional elements other than the listed elements. The term "implementation" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclo-

What is claimed is:

1. A method of aerial refueling, the method comprising:
receiving a video frame showing an aircraft to be refueled;
receiving an initial position estimate and an initial pose estimate for the aircraft;
based on at least the initial position estimate and the initial pose estimate, generating an initial rendering of an aircraft model of the aircraft;
based on at least the video frame and the initial rendering of the aircraft model, determining refinement parameters for the initial position estimate and the initial pose estimate;
based on at least the initial position estimate, the initial pose estimate, and the refinement parameters, determining a refined position estimate and a refined pose estimate for the aircraft;
based on at least the refined position estimate and the refined pose estimate for the aircraft, determining a position and pose of a fuel receptacle on the aircraft; and
based on at least the position and pose of the fuel receptacle, controlling an aerial refueling boom to engage the fuel receptacle.

2. The method of claim 1, wherein the video frame is provided by a single camera.

3. The method of claim 1, wherein the refinement parameters comprise a translation refinement and a rotational refinement.

4. The method of claim 1, further comprising:
determining the initial position estimate and the initial pose estimate based on at least the video frame showing the aircraft or a prior video frame showing the aircraft.

5. The method of claim 1, further comprising:
determining the initial position estimate using a prior refined position estimate; and
determining the initial pose estimate using a prior refined pose estimate.

6. The method of claim 1, further comprising:
determining a position and pose of a boom tip of the aerial refueling boom, wherein controlling the aerial refueling boom to engage the fuel receptacle comprises controlling the aerial refueling boom to engage the fuel receptacle based on at least the position and pose of the fuel receptacle and the position and pose of the boom tip.

7. The method of claim 1, further comprising:
generating an overlay image comprising:
a model projection, based on at least the aircraft model, the refined position estimate, and the refined pose estimate; and
the video frame showing the aircraft or a subsequent video frame showing the aircraft; and
displaying the overlay image.

8. A system for aerial refueling, the system comprising:
one or more processors; and
a memory storing instructions that, when executed by the one or more processors, cause the one or more processors to perform operations comprising:
receiving a video frame showing an aircraft to be refueled;
receiving an initial position estimate and an initial pose estimate for the aircraft;
based on at least the initial position estimate and the initial pose estimate, generating an initial rendering of an aircraft model of the aircraft;
based on at least the video frame and the initial rendering of the aircraft model, determining refinement parameters for the initial position estimate and the initial pose estimate;
based on at least the initial position estimate, the initial pose estimate, and the refinement parameters, determining a refined position estimate and a refined pose estimate for the aircraft;
based on at least the refined position estimate and the refined pose estimate for the aircraft, determining a position and pose of a fuel receptacle on the aircraft; and
based on at least the position and pose of the fuel receptacle, controlling an aerial refueling boom to engage the fuel receptacle.

9. The system of claim 8, wherein the video frame is provided by a single camera.

10. The system of claim 8, wherein the refinement parameters comprise a translation refinement and a rotational refinement.

11. The system of claim 8, wherein the operations further comprise:
determining the initial position estimate and the initial pose estimate based on at least the video frame showing the aircraft or a prior video frame showing the aircraft.

12. The system of claim 8, wherein the operations further comprise:
determining the initial position estimate using a prior refined position estimate; and
determining the initial pose estimate using a prior refined pose estimate.

13. The system of claim 8, wherein the operations further comprise:
determining a position and pose of a boom tip of the aerial refueling boom, wherein controlling the aerial refueling boom to engage the fuel receptacle comprises controlling the aerial refueling boom to engage the fuel receptacle based on at least the position and pose of the fuel receptacle and the position and pose of the boom tip.

14. The system of claim 8, further comprising:
a boom control that controls the aerial refueling boom to engage the fuel receptacle.

15. A computer program product, comprising a non-transitory computer usable medium having a computer readable program code embodied therein, the computer readable program code adapted to be executed to implement a method of aerial refueling, the method comprising:
receiving a video frame showing an aircraft to be refueled;
receiving an initial position estimate and an initial pose estimate for the aircraft;
based on at least the initial position estimate and the initial pose estimate, generating an initial rendering of an aircraft model of the aircraft;
based on at least the video frame and the initial rendering of the aircraft model, determining refinement parameters for the initial position estimate and the initial pose estimate;
based on at least the initial position estimate, the initial pose estimate, and the refinement parameters, determining a refined position estimate and a refined pose estimate for the aircraft;

based on at least the refined position estimate and the refined pose estimate for the aircraft, determining a position and pose of a fuel receptacle on the aircraft; and based on at least the position and pose of the fuel receptacle, controlling an aerial refueling boom to engage the fuel receptacle.

16. The computer program product of claim 15, wherein the video frame is provided by a single camera.

17. The computer program product of claim 15, wherein the refinement parameters comprise a translation refinement and a rotational refinement.

18. The computer program product of claim 15, wherein the method further comprises:
determining the initial position estimate and the initial pose estimate based on at least the video frame showing the aircraft or a prior video frame showing the aircraft.

19. The computer program product of claim 15, wherein the method further comprises:
determining the initial position estimate using a prior refined position estimate; and
determining the initial pose estimate using a prior refined pose estimate.

20. The computer program product of claim 15, wherein the method further comprises:
determining a position and pose of a boom tip of the aerial refueling boom, wherein controlling the aerial refueling boom to engage the fuel receptacle comprises controlling the aerial refueling boom to engage the fuel receptacle based on at least the position and pose of the fuel receptacle and the position and pose of the boom tip.

* * * * *